United States Patent
Park et al.

(10) Patent No.: US 10,028,002 B2
(45) Date of Patent: Jul. 17, 2018

(54) SERVER DEVICE FOR SHARING CONTENTS, CLIENT DEVICE, AND METHOD FOR SHARING CONTENTS

(71) Applicant: SAMSUNG ELECTRONICS CO., LTD., Gyeonggi-do (KR)

(72) Inventors: Chun-bae Park, Suwon-si (KR); Sung-kee Kim, Hwaseong-si (KR); Ga-hyun Ryu, Suwon-si (KR); Tae-sung Park, Yongin-si (KR); Duk-gu Sung, Seoul (KR); Hyun-woo Lim, Seoul (KR); Do-young Joung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/103,928

(22) PCT Filed: Dec. 16, 2013

(86) PCT No.: PCT/KR2013/011679
§ 371 (c)(1),
(2) Date: Jun. 13, 2016

(87) PCT Pub. No.: WO2015/093637
PCT Pub. Date: Jun. 25, 2015

(65) Prior Publication Data
US 2016/0316243 A1    Oct. 27, 2016

(51) Int. Cl.
*H04N 7/173* (2011.01)
*H04N 21/258* (2011.01)
(Continued)

(52) U.S. Cl.
CPC ... *H04N 21/25808* (2013.01); *H04N 21/2343* (2013.01); *H04N 21/25858* (2013.01); *H04N 21/6582* (2013.01)

(58) Field of Classification Search
CPC ......... H04N 21/2343; H04N 21/25808; H04N 21/6582
See application file for complete search history.

(56) References Cited

U.S. PATENT DOCUMENTS 7,603,622 B2    10/2009  Choi et al.
7,774,425 B2    8/2010   Jin et al.
(Continued)

FOREIGN PATENT DOCUMENTS

JP    2007-158854 A    6/2007
JP    2007-174642 A    7/2007
(Continued)

OTHER PUBLICATIONS

Written Opinion dated Sep. 12, 2014 issued by International Searching Authority in counterpart International Application No. PCT/KR2013/011679 (PCT/ISA/237).
(Continued)

*Primary Examiner* — James R Marandi
(74) *Attorney, Agent, or Firm* — Sughrue Mion, PLLC

(57) ABSTRACT

A contents sharing method includes a step for receiving playback capability information from a client apparatus; a determination step for determining, on the basis of the received playback capability information, whether to carry out partial processing of contents to be supplied to the client apparatus; and a transmission step for processing some frames in the contents to be played in the client apparatus and transmitting the processed frames to the client apparatus if it is determined that the partial processing is to be performed. Accordingly, contents may be efficiently provided.

14 Claims, 24 Drawing Sheets

(51) Int. Cl.
*H04N 21/2343* (2011.01)
*H04N 21/658* (2011.01)

(56) References Cited

U.S. PATENT DOCUMENTS

| | | | |
|---|---|---|---|
| 7,817,563 | B1 | 10/2010 | Buragohain et al. |
| 8,032,129 | B2 | 10/2011 | Bae et al. |
| 8,056,109 | B2 | 11/2011 | Kim et al. |
| 9,009,266 | B2 | 4/2015 | Cho et al. |
| 9,055,194 | B2 | 6/2015 | Cho et al. |
| 9,258,625 | B2* | 2/2016 | Martin ............... H04N 21/2393 |
| 2006/0069797 | A1 | 3/2006 | Abdo et al. |
| 2006/0282737 | A1* | 12/2006 | Shi .................... H03M 13/2966 714/746 |
| 2007/0136488 | A1 | 6/2007 | Cho et al. |
| 2007/0168542 | A1 | 7/2007 | Gupta et al. |
| 2007/0237090 | A1 | 10/2007 | Kim et al. |
| 2007/0237115 | A1 | 10/2007 | Bae et al. |
| 2007/0261023 | A1* | 11/2007 | Choo ........................ G06F 8/36 717/106 |
| 2010/0106770 | A1* | 4/2010 | Taylor .................. H04L 67/303 709/203 |
| 2011/0037712 | A1 | 2/2011 | Kim et al. |
| 2012/0150999 | A1 | 6/2012 | Svensson et al. |
| 2012/0151372 | A1 | 6/2012 | Kominac et al. |
| 2012/0174093 | A1 | 7/2012 | Davila et al. |
| 2012/0317485 | A1 | 12/2012 | Ding et al. |
| 2013/0117416 | A1 | 5/2013 | Sun et al. |
| 2015/0009284 | A1* | 1/2015 | Yin ....................... H04L 49/206 348/14.12 |

FOREIGN PATENT DOCUMENTS

| | | |
|---|---|---|
| JP | 2008-206077 A | 9/2008 |
| KR | 10-0663448 B1 | 1/2007 |
| KR | 10-0702516 B1 | 4/2007 |
| KR | 10-0754196 B1 | 9/2007 |
| KR | 10-0782503 B1 | 12/2007 |
| KR | 10-0803609 B1 | 2/2008 |
| KR | 10-0820350 B1 | 4/2008 |
| KR | 10-2008-0046971 A | 5/2008 |
| KR | 10-2008-0085258 A | 9/2008 |
| KR | 10-2009-0000092 A | 1/2009 |
| KR | 10-2012-0123405 A | 11/2012 |

OTHER PUBLICATIONS

International Search Report dated Sep. 12, 2014 issued by International Searching Authority in counterpart International Application No. PCT/KR2013/011679 (PCT/ISA/210).

Communication dated Nov. 2, 2016 issued by the European Patent Office in counterpart European Patent Application No. 13899911.5.
Pieter Simoens, et al; "Design and implementation of a hybrid remote display protocol to optimize multimedia experience on thin client devices"; Telecommunication Networks and Applications Conference; IEEE; Dec. 7, 2008; pp. 391-396; 6 pgs. total.

* cited by examiner

SERVER DEVICE FOR SHARING CONTENTS, CLIENT DEVICE, AND METHOD FOR SHARING CONTENTS

CROSS-REFERENCE TO RELATED APPLICATION(S)

This application is a U.S. national stage application under 35 U.S.C. 371 of International Application No. PCT/KR2013/011679, filed on Dec. 16, 2013, the disclosure of which is incorporated herein by reference in its entirety.

BACKGROUND

1. Field

Apparatuses and methods consistent with exemplary embodiments relate to a server device for sharing contents, a client device, and a method for sharing the contents, and more particularly, to a server device for sharing contents taking into account the characteristics of a client device, the client device receiving the contents from the server device and reproducing the received contents, and a method for sharing the contents.

2. Description of Related Art

Due to advancements in electronic technology, various kinds of electronic devices have been developed, including user terminals having advanced performance compared to conventional devices. For example, technology related to smartphones, smart TVs, etc., has increased.

Users may connect their user terminals and peripheral devices to each other through a network, and use the connected user terminals and peripheral devices. For example, contents may be shared between a user's device and another device.

To share contents, a device receiving the contents (e.g., a client device) may need to have hardware and software for processing the received contents.

However, as various kinds of contents are created, a parser, a codec, and the like, may be required to process the contents. Therefore, even if the client device receives the contents from a server device, the client device may not be capable of processing the contents if it does not have the parser or the codec.

Therefore, even if the contents themselves have been shared normally the contents may not be capable of being reproduced by the other device.

Therefore, there is a use for a technology capable of more effectively sharing content.

SUMMARY

Exemplary embodiments address at least the above problems and/or disadvantages and other disadvantages may not be described above. Also, the exemplary embodiments are not required to overcome the disadvantages described above, and may not overcome any of the problems described above.

One or more exemplary embodiments provide a server device appropriately processing and then providing contents taking into account the performance of a client device, the client device receiving and reproducing the contents, and a method for sharing the contents.

According to an aspect of an exemplary embodiment, there is provided a method for sharing contents of a server device, the method including receiving reproduction capability information from a client device; determining whether to perform partial processing for contents to be provided to the client device, based on the received reproduction capability information; and in response to determining that partial processing is to be performed, processing at least one frame of the contents according to the received reproduction capability information, and transmitting the processed at least one frame to the client device.

In response to determining that the client device has a parser and a codec for processing the contents based on attributes of the contents and the reproduction capability information, the partial processing may not be performed, and in response to determining that the client device does not have at least one of the parser and the codec based on the attributes of the contents and the reproduction capability information, the partial processing may be performed.

The operation of transmitting the partially processed at least one frame may include: selecting at least one of a highlight image frame, an image frame sampled according to a preset period, and an image frame having a preset order in the contents; and performing at least one processing among parsing and decoding for the selected at least one frame.

The method may include performing at least one processing among parsing and decoding for all of the contents if at least one of the frames is selected by the client device, and transmitting the parsed contents and the decoded contents to the client device.

According to an aspect of another exemplary embodiment, there is provided a server device including a memory configured to store contents to be provided to a client device; a communicator configured to receive reproduction capability information from the client device; and a controller configured to: determine whether to perform a partial processing for the contents to be provided to the client device based on the received reproduction capability information, and in response to determining that the partial processing is to be performed, process at least one frame in the contents to be reproducible in the client device.

The controller may be further configured to not perform the partial processing if the client device has a parser and a codec for processing the contents based on attributes of the contents and the reproduction capability information, and perform the partial processing if the client device does not have at least one of the parser and the codec based on the attributes of the contents and the reproduction capability information.

The controller may be further configured to select at least one of a highlight image frame, an image frame sampled according to a preset period, and an image frame having a preset order in the contents to perform at least one processing among parsing and decoding for the selected at least one frame.

The controller may be further configured to perform at least one processing among parsing and decoding for all of the contents if at least one of the frames is selected by the client device to transmit the parsed contents and the decoded contents to the client device.

According to an aspect of another exemplary embodiment, there is provided a method for sharing contents of a client device, the method including receiving and storing a parser and a codec list from a server device; receiving a reproduction request for contents stored in the server device; determining whether the contents are reproducible by using information about a parser and a codec included in the client device and the received parser and the received codec list; and transmitting a content sharing request to the server device if the contents are reproducible and displaying a reproduction disable message if the contents are not reproducible.

According to an aspect of another exemplary embodiment, there is provided a client device including a communicator configured to receive a parser and a codec list from a server device; a memory configured to store the parser and the codec list; an input interface configured to receive a reproduction request for contents stored in the server device; a controller configured to determine whether the contents are reproducible by using information about a parser and a codec included in the client device and the received parser and the received codec list, and transmit a content sharing request to the server device if the contents are reproducible; and a display configured to display a reproduction disable message if the contents are not reproducible.

According to an aspect of another exemplary embodiment, there is provided a screen sharing system including: a server device; and at least one client device connected to the server device configured to display a main screen provided from the server device, wherein the server device is configured to: receive reproduction capability information from the client device, and in response to determining that the client device is not capable of reproducing contents based on attributes of the contents, process the contents in a reproducible form to transmit the processed contents to the client device, and wherein the client device displays a reproduction screen for displaying the contents transmitted from the server device on the main screen.

The server device may be configured to transmit the contents to the client device in response to determining that the client device is capable of reproducing the contents, and the client device may be configured to parse and decode the contents transmitted from the server device and display the reproduction screen on the main screen.

According to an aspect of another exemplary embodiment, there is provided a method for sharing contents of a server device, the method including: selecting contents to transmit to a client device; receiving reproduction capability information from the client device; determining whether the client device has a parser and a codec for processing the contents; performing processing on the contents according to the determination; and transmitting the contents to the client device.

The performing processing on the contents may include: parsing the contents and decoding the contents in response to determining that the client device does not have the parser or the codec; parsing the contents and not decoding the contents in response to determining that the client device has the codec and does not have the parser; and transmitting the contents to the client device without parsing the contents or decoding the contents in response to determining that the client device has the parser and the codec.

According to one or more exemplary embodiments, the content sharing may be effectively performed between the server device and the client device while not excessively wasting the communication resource between the server device and the client device.

BRIEF DESCRIPTION OF THE DRAWINGS

The above and/or other aspects will be more apparent by describing exemplary embodiments, with reference to the accompanying drawings, in which.

DETAILED DESCRIPTION

Below, exemplary embodiments will be described in detail with reference to the accompanying drawings.

Figure 1:
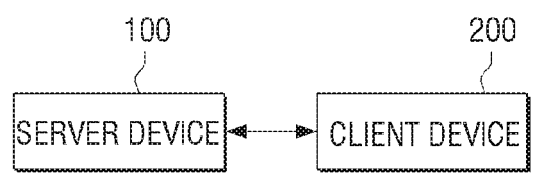
FIG. 1 is a block diagram illustrating a configuration of a content sharing system according to an exemplary embodiment.

FIG. 1 is a view illustrating a configuration of a content sharing system according to an exemplary embodiment. FIG. 1 illustrates a case in which a server device 100 and a client device 200 are communicatively connected directly with each other (i.e., peer to peer).

Referring to FIG. 1, the server device 100 stores one or more contents that may be transmitted to the client device 200. The contents may be various kinds of data, such as moving pictures (e.g., videos), music, pictures, images, documents, texts, programs, and the like. The server device 100 may be implemented as a general server, but the server device 100 is not limited thereto. For example, the server device 100 may be implemented as a portable phone, a TV, a personal digital assistant (PDA), a tablet PC, a PC, a notebook PC, an electronic frame, a kiosk, an electronic billboard, other user terminals, and the like. In addition, the client device 200 may be implemented as various types of devices capable of outputting video contents, audio contents, and the like. For example, the client device 200 may also be implemented as various terminals such as a portable phone, a TV, a personal digital assistant (PDA), a tablet PC, a PC, a notebook PC, an electronic frame, a kiosk, an electronic billboard, and the like.

The client device 200 may perform a content sharing function to access the contents stored in the server device 100. According to the content sharing function, the contents are downloaded or streamed between a plurality of different devices to be shared. An example of the content sharing function may include a digital living network alliance (DLNA) function. In DLNA, a variety of contents are shared between various devices. In DLNA, a device providing the contents is referred to as a digital media server (DMS) and a device reproducing the provided contents is referred to as a digital media renderer (DMR) or a digital media player (DMP). In FIG. 1, the client device 200 may be the DMR or the DMP, and the server device 100 may be the DMS, however exemplary embodiments are not limited to this.

The server device 100 may check reproduction capability information of the client device 200 to determine whether the client device 200 may reproduce the contents. The reproduction capability information may be information about the parser and the codec included in the client device 200.

The parser is a configuration for parsing the contents to detect a variety of information for reproducing the contents. Examples of the parser may include a moving picture parser (e.g., movie parser), an image parser, an audio parser, an XML parser, and the like. The codec is a configuration capable of encoding or decoding a data stream or a signal. Examples of the codec may include a moving picture expert group (MPEG) codec, a Divx codec, an AC3 codec, an OGG codec, an Xvid codec, an H.264 codec, a wmv7, 8, 9 codec, a video codec, and the like. A detailed configuration of the parser and the codec will be described below.

At the time of reproducing the contents, an appropriate parser and codec may be used according to a format of the content. In the case in which the client device 200 does not include at least one of the parser and the codec, even if the contents are transmitted from the server device 100, the contents may be improperly reproduced.

The server device 100 may check the reproduction capability information of the client device 200 and compare the checked reproduction capability information with attributes of contents to be provided to the client device 200. If it is determined that the client device 200 includes both the parser and the codec corresponding to the attributes of the contents, the server device 100 transmits the contents to the client device 200 as is. As a result, because the contents are transmitted in a compressed state, a communication resource, such as a frequency or a time slot, may be saved.

If it is determined that the client device 200 does not include at least one of the parser and the codec, the server device 100 processes the contents in an output enable form and transmits the contents to the client device 200. If the client device 200 does not include the parser, the server device 100 performs a parsing and transmits the contents together with the parsing result to the client device 200. If the client device 200 does not include the codec or does not include both the parser and the codec, the server device 100 performs the parsing and decoding and transmits the decoded contents to the client device 200. As a result, the client device 200 may directly receive and reproduce data of a reproducible contents screen.

As described above, the reproduction capability information includes the information about the parser and the codec According to an exemplary embodiment, the reproduction capability information may also include various additional information such as a resolution, a display size, an output frame rate, an output color gamut, and the like, in addition to the information about the parser and the codec.

The server device 100 may perform various additional processes according to the additional information of the client device 200. If display resolution of the client device is higher than the original resolution of the contents, the server device 100 may perform a process of interpolating the resolution of the contents to be matched to the resolution of the client device. Alternatively, in the case in which an aspect ratio of a display unit included in the client device 200 is different from an aspect ratio of the contents, the server device 100 may perform cropping to match the aspect ratio of the display unit included in the client device 200. Also, the server device 100 may reduce the resolution to match parsing capability and decoding capability of the client device 200 or adjust a bit rate and transmit the reduced resolution or the adjusted bit rate to the client device 200.

In addition, as described above, although FIG. 1 describes the case in which the server device 100 and the client device 200 directly perform the communication, the server device 100 and the client device 200 may also be communicatively connected to each other through an access point (AP) or other devices in a networked configuration.

Figure 2:
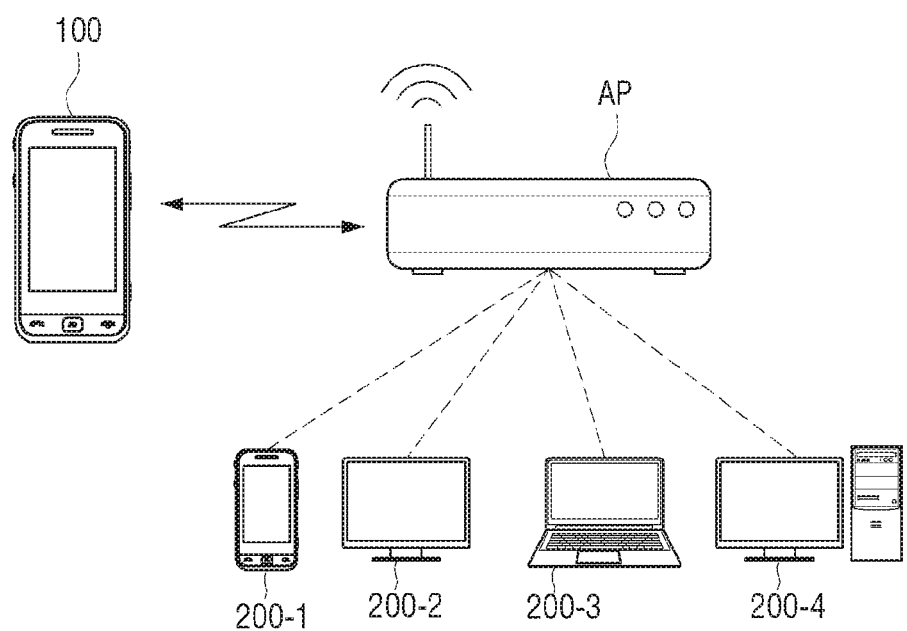
FIG. 2 is a view illustrating a content sharing system that includes an access point, according to an exemplary embodiment.

FIG. 2 is a view illustrating a configuration of a content sharing system that further includes an access point. Referring to FIG. 2, the content sharing system includes a plurality of terminals 100, 200-1, 200-2, 200-3, and 200-4, and an access point AP. The respective terminals 100, 200-1, 200-2, 200-3, and 200-4 may separately serve as the server device 100 or the client device 200. FIG. 2 illustrates a case in which one terminal serves as the server device 100 and the rest of the terminals serve as the client devices 200-1, 200-2, 200-3, and 200-4.

Referring to FIG. 2, the server device 100 and the respective client devices 200-1, 200-2, 200-3, and 200-4 form a network through the access point AP.

If at least one of the client devices 200-1, 200-2, 200-3, and 200-4 selects the content sharing function, the corresponding client device searches the server device 100 through the access point AP. If the respective client devices 200-1, 200-2, 200-3, and 200-4 also have a server function, the rest of the client devices having the server function as well as the server device 100 may be searched.

For example, if the first client device 200-1 selects the content sharing function, the first client device 200-1 may search the server device 100 and may then request contents information for the server device 100. If the server device 100 transmits the stored information about the contents, the first client device 200-1 displays the contents information. If a user selects one of the contents, the first client device 200-1 transmits a request signal for the selected contents and reproduction capability information of the first client device 200-1 to the server device 100.

The reproduction capability information may be transmitted together with the request signal, but exemplary embodiments are not limited thereto. That is, the reproduction capability information may also be transmitted to the server device 100 if there is a transmission request of the server device 100, if a preset period arrives, if the first client device 200-1 is initially connected to the server device 100, if a parser or a codec of the first client device 200-1 is changed, etc.

The server device 100 compares the reproduction capability information of the first client device 200-1 with the attributes of the contents to determine whether the contents may be reproduced, as described above. The server device 100 processes and transmits the contents as received or by altering the contents appropriately, according to the determination result.

Although the case in which the first client device 200-1 selects the content sharing function has been described above, according to another exemplary embodiment, an attempt to share the contents may be performed by the server device 100.

If the server device 100 selects the content sharing function, the server device 100 may display a list for the stored contents. The user of the server device 100 may select the contents to be shared from the list.

If the contents are selected, the server device 100 may broadcast a search signal through the access point AP. The respective client devices 200-1, 200-2, 200-3, and 200-4 receive the search signal transmit response signals. The response signals may include identity information, such as internet protocol (IP) addresses, of the respective client devices 200-1, 200-2, 200-3, and 200-4. In addition, the response signals may also include the reproduction capability information of the respective client devices 200-1, 200-2, 200-3, and 200-4.

The server device 100 displays a list for the respective client devices transmitting the response signals. The user of the server device 100 may select the client device with which the contents are to be shared, from the displayed list.

If the client device is selected, the server device 100 determines whether the client device may reproduce the contents, based on the reproduction capability information of the selected client device and the attribute of the contents. The server device 100 processes and then transmits the contents as is or altering them appropriately according to the determination result to the client device.

As described above, the contents may be shared between the server device 100 and the client device 200 by various means and the contents may be processed according to characteristics of the client device 200, thereby making it possible to increase efficiency.

Although FIG. 2 describes one or more exemplary embodiments in which the contents are shared using the access point, the description in FIG. 2 may also be implemented according to an exemplary embodiment of FIG. 1.

Figure 3:
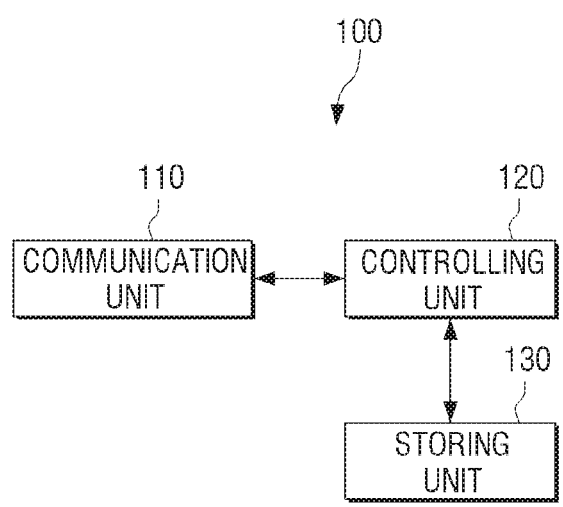
FIG. 3 is a block diagram illustrating a configuration of a server device according to an exemplary embodiment.

FIG. 3 is a block diagram illustrating a configuration of the server device 100 according to an exemplary embodiment. Referring to FIG. 3, the server device 100 includes a communication unit 110 (e.g., communicator), a controlling unit 120 (e.g., controller), and a storing unit 130 (e.g., storage or memory).

The communication unit 110 receives the reproduction capability information from the client device 200. The communication unit 110 may perform communication with the client device 200 using various communication schemes.

For example, various communication schemes such as 3G, 4G, Wi-Fi, Ethernet (e.g., wired), Bluetooth, near field communication (NFC), Zigbee, and the like, may be used. As a protocol for transmitting and receiving a variety of information, various protocols such as a simple object access protocol (SOAP), a hypertext transfer protocol (HTTP), a real time protocol (RTP), a dynamic adaptive streaming over HTTP (DASH), and the like, may be used.

The storing unit 130 stores a variety of contents and programs. The storing unit 130 may also store a variety of information about the attributes of the contents. For example, attribute information such as a type of contents, a contents format, a contents size, codec information for processing the contents, and the like, may be stored. This attribute information may be stored in a form of meta data file such as a media presentation description (MPD) file or a manifest file, depending on a kind of protocols.

The controlling unit 120 determines whether the client device may reproduce the contents based on the attribute of the contents to be shared with the client device 200 and the reproduction capability information of the client device 200. As the determination result, if the client device may reproduce the contents, the controlling unit 120 transmits the contents to the client device as is.

On the other hand, if the client device may not reproduce the contents, the controlling unit 120 processes the contents in a reproducible form and transmits the processed contents to the client device 200.

The controlling unit 120 checks whether the client device has the parser and the codec corresponding to the contents, based on the reproduction capability information. For example, if video data included in the contents is compressed by MS MPEG-4 Video Codec V3 and audio data included in the contents is compressed by Windows Media Audio V2, the controlling unit 120 determines whether the client device has the corresponding codec. According to the determination result, if the client device does not have at least one of the parser and the codec, the controlling unit 120 performs at least one processing of parsing and decoding and transmits a processed result to the client device 200.

If the client device 200 may not perform the parsing of the contents, the controlling unit 120 performs the parsing process for the contents and transmits the parsing processed contents to the client device 200.

If the client device 200 does not have the codec for at least one of the video data and the audio data included in the contents (i.e., if the decoding may not be performed), the controlling unit 120 decodes at least one of the audio data and the video data included in the contents and transmits the decoded contents to the client device 200.

There may also be a case in which the server device 100 does not have the parser or the codec for the contents. In this case, the controlling unit 120 determines whether it may have the parser or the codec for reproducing the contents.

The controlling unit 120 searches the parser or the codec for reproducing the contents on a network or a web connected to the server device 100 using the communication unit 110. If a source device having the parser or the codec is found, the controlling unit 120 transmits a transmission request for the searched parser or codec to the source device. Accordingly, the controlling unit 120 downloads the parser or the codec from the source device and installs the downloaded parser or codec in the storing unit 130. Then, the controlling unit 120 processes the contents in the reproducible form using the installed parser and codec and then transmits the processed contents to the client device 200.

If the controlling unit 120 does not find the source device for the parser or the codec, the contents are determined as a reproduction disable state. If the contents are determined as the reproduction disable state, the controlling unit 120 may not transmit the contents to the client device 200.

If the content sharing is requested from the client device 200, the controlling unit 120 may transmit a reproduction disable response for informing that the contents are in the reproduction disable state to the client device 200. If the content sharing is requested from the server device 100 itself, the controlling unit 120 may output an error message for informing that the contents are in the reproduction disable state.

A case in which the controlling unit 120 processes the contents using the parser and the codec which are searched by the server device 100 and are newly installed, and then transmits the contents to the client device 200 has been described. However, the controlling unit 120 may also transmit the parser or the codec itself provided from the source device together with the contents to the client device 200 according to one or more other exemplary embodiments. In this case, after the client device 200 autonomously installs the transmitted parser or codec, the client device 200 may reproduce the contents using the installed parser and codec. As a result, the communication resources may be efficiently used.

Figure 4:
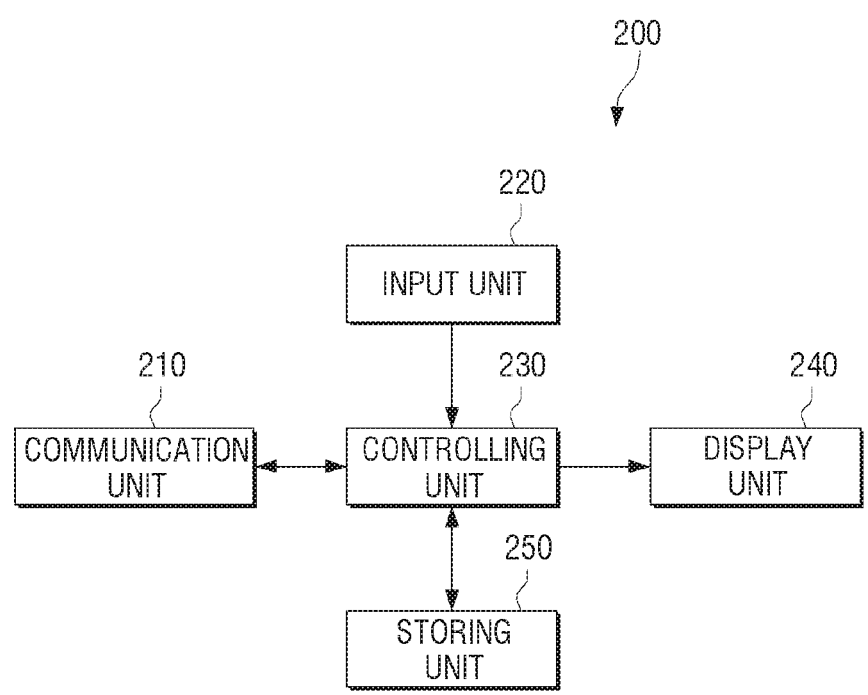
FIG. 4 is a block diagram illustrating a configuration of a client device according to an exemplary embodiment.

FIG. 4 is a block diagram illustrating a configuration of the client device according to an exemplary embodiment. Referring to FIG. 4, the client device 200 includes a communication unit 210 (e.g., communicator), an input unit 220 (e.g., input interface), a controlling unit 230 (e.g., controller), a display unit 240 (e.g., display), and a storing unit 250 (e.g., storage or memory).

The communication unit 210 performs communications with the server device 100. As described above, the communication unit 210 may perform the communication with the server device 100 using various communication schemes such as 3G, 4G, WiFi, Ethernet (wired), Bluetooth, near field communication (NFC), Zigbee, and the like. In addition, the communication unit 210 may perform the communication using various communication protocols such as a simple object access protocol (SOAP), a hypertext transfer protocol (HTTP), a real time protocol (RTP), a dynamic adaptive streaming over HTTP (DASH), and the like.

The communication unit 210 transmits the reproduction capability information of the client device to the server device 100. The reproduction capability information may be generated in various formats according to the communication protocol applied to the communication unit 210, and may be transmitted. As an example, the HTTP protocol will be described below. The HTTP protocol is a protocol transmitting data in Get and Post schemes. Both schemes have a form transmitting a variable and a pair of variable values. The communication unit 210 defines variables representing the parser and the codec installed in the client device 200, inserts parser and codec information into the variable value of the corresponding variable, and transmits the variable value to the server device 100. This scheme may be applied to 3G, 4G, WiFi, Ethernet, and the like.

If the NFC or Bluetooth scheme is applied, the communication unit 210 assigns some regions in the transmitted data format, formats the parser and codec information in a predetermined length, carries the parser and codec information in the some regions, and then transmits the carried parser and codec information.

Figure 5:
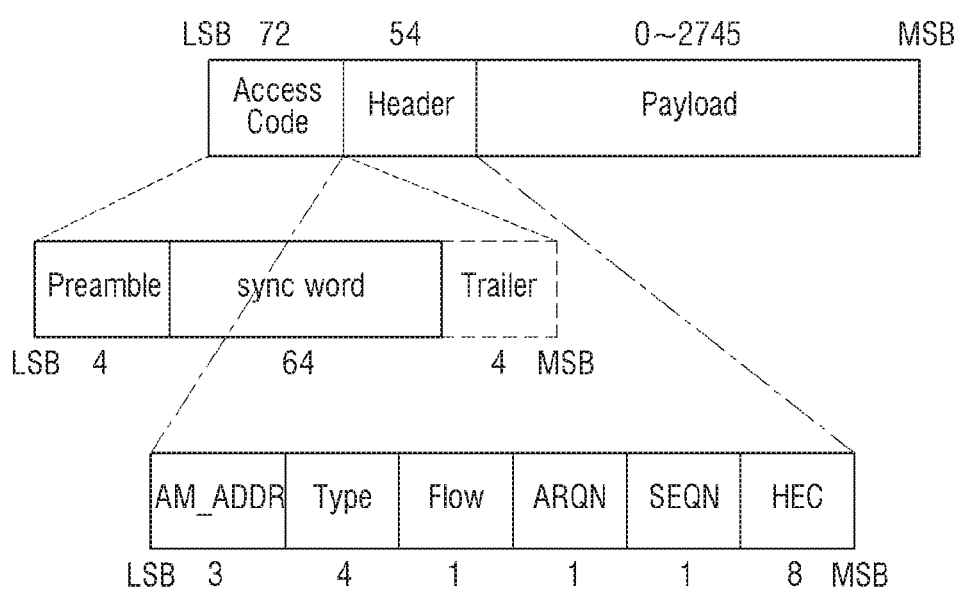
FIG. 5 is a view illustrating an example of a message format used for sharing contents, according to an exemplary embodiment.

FIG. 5 is a view illustrating a configuration of a packet of the Bluetooth scheme according to an exemplary embodiment. Referring to FIG. 5, the packet includes an access code, a header, and a payload. The access code and the header have a fixed length, and the payload has a variable length depending on a kind of packets. The access code includes a preamble, a sync word, and a trailer. The access code is used to identify the packet. The header includes an address (e.g., AM_ADDR) of the device, a type indicating a kind of payload, FLOW, ARQN, SEQN, etc., for a retransmission control, a flow control, and the like.

The communication unit 210 inserts the reproduction capability information into a payload portion of the packet and transmits the packet. The reproduction capability information may include information about the parser and the codec and various other additional information as described above. The parser and the codec may be each implemented by hardware or software. In the case in which the parser and the codec are implemented by software, the parser and the codec are stored in the storing unit 250. A timing at which the reproduction capability information is transmitted may be varied according to one or more exemplary embodiments.

As an example, the communication unit 210 may transmit the reproduction capability information to the server device 100 each time a preset time period arrives.

As another example, the communication unit 210 transmits the reproduction capability information when the input unit 220 selects the content sharing function. The reproduction capability information may also be transmitted together with the sharing request for the contents and may also be transmitted before or after the sharing request.

According to another exemplary embodiment, the communication unit 210 transmits the reproduction capability information when server device 100 transmits an information request.

According to another exemplary embodiment, the communication unit 210 may transmit the reproduction capability information in a case in which the client device 200 is initially connected to the server device 100, or may transmit the reproduction capability information each time the reproduction capability is changed.

As described above, the communication unit 210 may provide the reproduction capability information to the server device 100 by various schemes.

Referring to FIG. 4, the input unit 220 receives a variety of user selection instructions. The input unit 220 may be implemented by a button or a wheel formed on a body of the client device 200, a touch screen, a touch pad, a mouse, a keyboard, a joystick, and the like. The user may select the content sharing function using the input unit 220.

The controlling unit 230 may control an operation of the client device 200 according to the user selection instruction input through the input unit 220. If the input unit 220 selects the content sharing function and the contents to be shared are selected, the controlling unit 230 controls the communication unit 210 to transmit the sharing request for the contents to the server device 100. The sharing request includes identifying information of the contents selected by the input unit 220.

If the contents are transmitted from the server device 100 according to the sharing request, the communication unit 210 receives the contents. The contents may be transmitted as is according to the reproduction capability information transmitted to the server device 100, or may be transmitted in a parsed or decoded state.

The controlling unit 230 stores the contents transmitted from the server device 100 in the storing unit 250. The controlling unit 230 outputs the contents stored in the storing unit 250 using the display unit 240. The client device 200 may further include a speaker. In the case in which the client device 200 includes the speaker, moving picture contents, music contents, and the like, may also be output.

If the contents are transmitted from the server device 100 in an original state, the controlling unit 230 parses the contents to divide the video data and the audio data and check codec information for each data. The controlling unit 230 decodes the video data and the audio data, respectively, using the codec corresponding to the checked codec information and outputs the decoded video data and audio data.

In the case in which the parser is not stored in the storing unit 250, the controlling unit 230 receives the parsed contents from the server device 100. The controlling unit 230 decodes the video data and the audio data within the contents depending on the parsing result, and outputs the decoded video data and audio data.

If both the parser and the codec are not provided, or the parser is not present, the controlling unit 230 receives the decoded contents from the server device 100. Accordingly, the controlling unit 230 immediately outputs the received contents through the display unit 240, or the like, without performing a separate additional process for the received contents.

The exemplary embodiments described above have described a case in which the client device 200 transmits its reproduction capability information to the server device 100 and the server device 100 determines reproduction capability of the client device 200 based on the transmitted reproduction capability information.

However, according to another exemplary embodiment, the client device 200 may also directly determine whether the contents may be reproduced.

That is, the communication unit 210 receives a parser and codec list from the server device 100. The communication unit 210 may receive the parser and codec list at the time of an initial connection with the server device 100 of the client device 200 or periodically, at predetermined time intervals.

The storing unit 250 stores the received parser and codec list. The storing unit 250 may also store information about the parser and the codec which are already installed in the client device 200.

In addition, the communication unit 210 may receive information about a contents list which may be provided from the server device 100.

The controlling unit 230 displays the received contents list using the display unit 240. The user may select one of the contents in the contents list and input the reproduction request using the input unit 220.

If the reproduction request is input, the controlling unit 230 determines whether the selected contents may be parsed and decoded by considering information about the parser and the codec which are pre-installed in the client device, and the parser and codec list received from the server device 100.

According to the determination result, if the parser for parsing the selected contents and the codec for decoding the selected contents are already installed in the client device 200, the controlling unit 230 determines that the contents may be reproduced and transmits the content sharing request to the server device 100 using the communication unit 210.

If at least one of the parser and the codec is not installed in the client device 200 and is installed in the server device 100, the controlling unit 230 may transmit its reproduction capability information or a parsing and decoding request when transmitting the content sharing request to the server device 100, to allow the server device 100 to transmit the contents after performing appropriate processing.

If at least one of the parser and the codec is not installed in the client device 200 and the server device 100, the controlling unit 230 determines that the contents may not be reproduced. In this case, the display unit 240 displays a reproduction disable message.

According to an exemplary embodiment described above, if the user selects the reproduction disable contents, the processes in which the contents are requested from the server device 100 and received, and the client device 200 then attempts to reproduce the contents, may be omitted. As a result, the resources for a communication process may be saved. In addition, in the case in which the contents may not be reproduced by the client device 200 itself, but may be reproduced by the server device 100, these contents may be immediately requested from the server device 100 and may be rapidly reproduced.

According to another exemplary embodiment, whether the contents may be reproduced may be indicated on the contents list itself displayed by the display unit 240 of the client device 200. For example, for the contents which may not be reproduced by the parser and the codec that are currently installed in the client device 200 and the server device 100, a sign, a text, an image, etc., for informing that the contents are currently in the reproduction disable state may be indicated on the contents list.

The contents in the reproduction disable state may be dimly indicated in an inactive state that may not be selected by the user to allow the user to quickly recognize that the corresponding contents may not be reproduced.

The contents in the reproduction disable state may also be implemented to not be indicated on the contents list at all.

As described above, the server device 100 and the client device 200 may determine whether the contents may be processed according to a capacity of each device and may take a measure accordingly.

Below, interactions between the server device 100 and the client device 200 for performing a method for sharing contents according to one or more exemplary embodiments will be described in detail.

Figure 6:
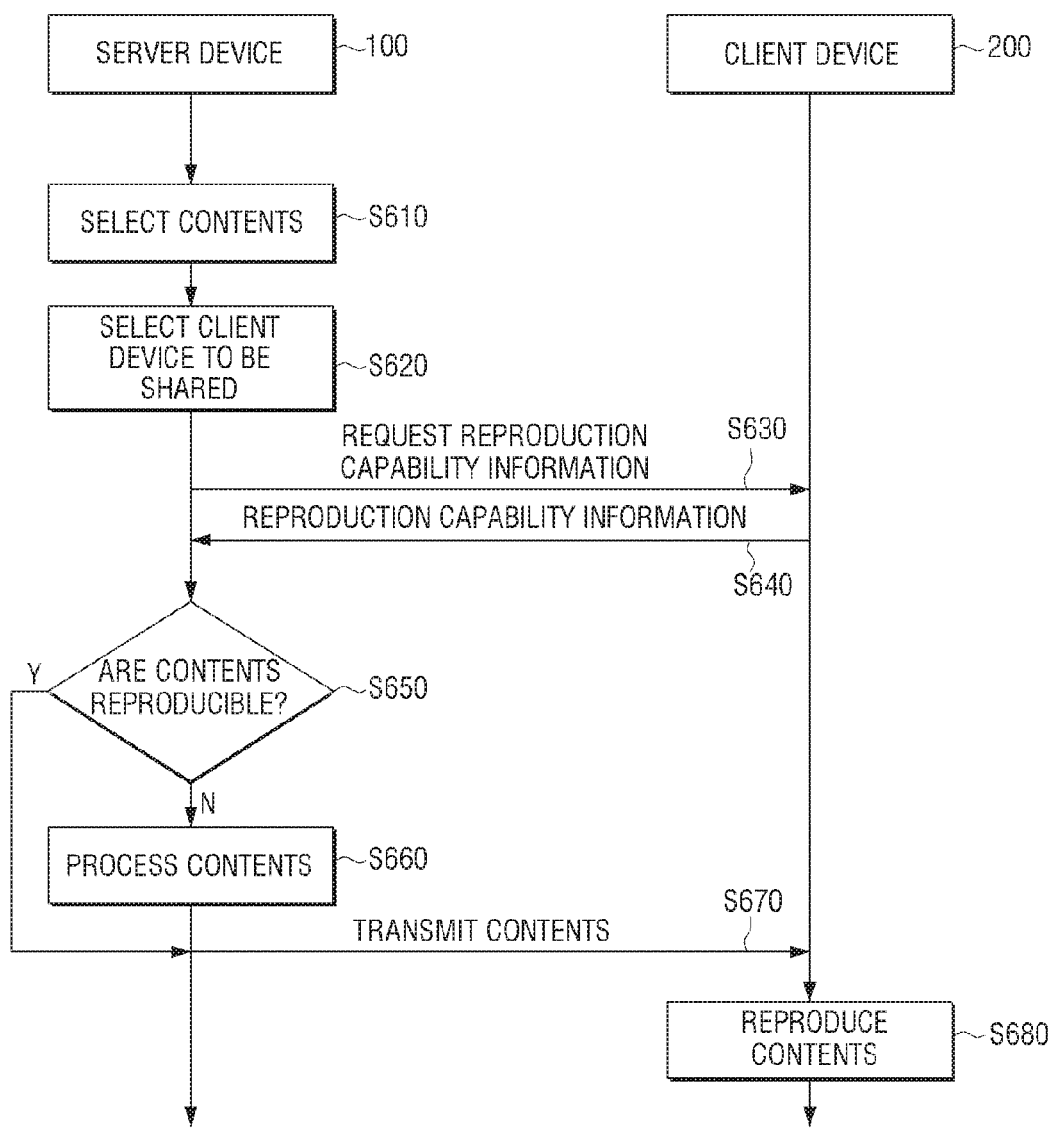
FIG. 6 is a timing diagram illustrating a method for sharing the contents according to an exemplary embodiment.

FIG. 6 is a timing diagram illustrating a method for sharing the contents according to an exemplary embodiment. FIG. 6 illustrates a process in which the user of the server device 100 transmits the contents which are stored in the server device 100 (or being reproduced by the server device 100) to the other device (e.g., the client device 200), to allow the client device 200 to reproduce the transmitted contents. If the user of the server device 100 intends to reproduce the contents according to a request of others or by using other devices, the user of the server device 100 may share the contents as illustrated in FIG. 6.

Referring to FIG. 6, the user may select the contents to be shared with other devices from the server device 100 (S610). Examples of the contents may include contents stored in the storing unit 130 in the server device 100, contents searched by the network connected to the server device 100, and the like.

After the user selects the contents, the user may select the client device with which to share the contents (S620). According to an exemplary embodiment, the server device 100 may display information on an external device which is communicatively connected thereto on a screen, to allow the user to select the information.

FIG. 6 illustrates that after the contents are selected, the client device may be selected. However, the selection order is not limited to this.

If the user selects the client device 200, the server device 100 is communicatively connected to the client device 200 and requests the reproduction capability information to the client device 200 (S630).

The client device 200 responds to the request and transmits the reproduction capability information (S640). As described above, the reproduction capability information may include various additional information such as a resolution, a display size, an output frame rate, an output color gamut, and the like, as well as the information about the parser and the codec.

The server device 100 compares the reproduction capability information and attributes of the contents selected by the user with each other to determine whether the contents may be reproduced (S650), and processes the contents (S660) or transmits the contents to the client device 200 as it is (S670), according to the determination result. The client device 200 reproduces the transmitted contents (S680).

Figure 7:
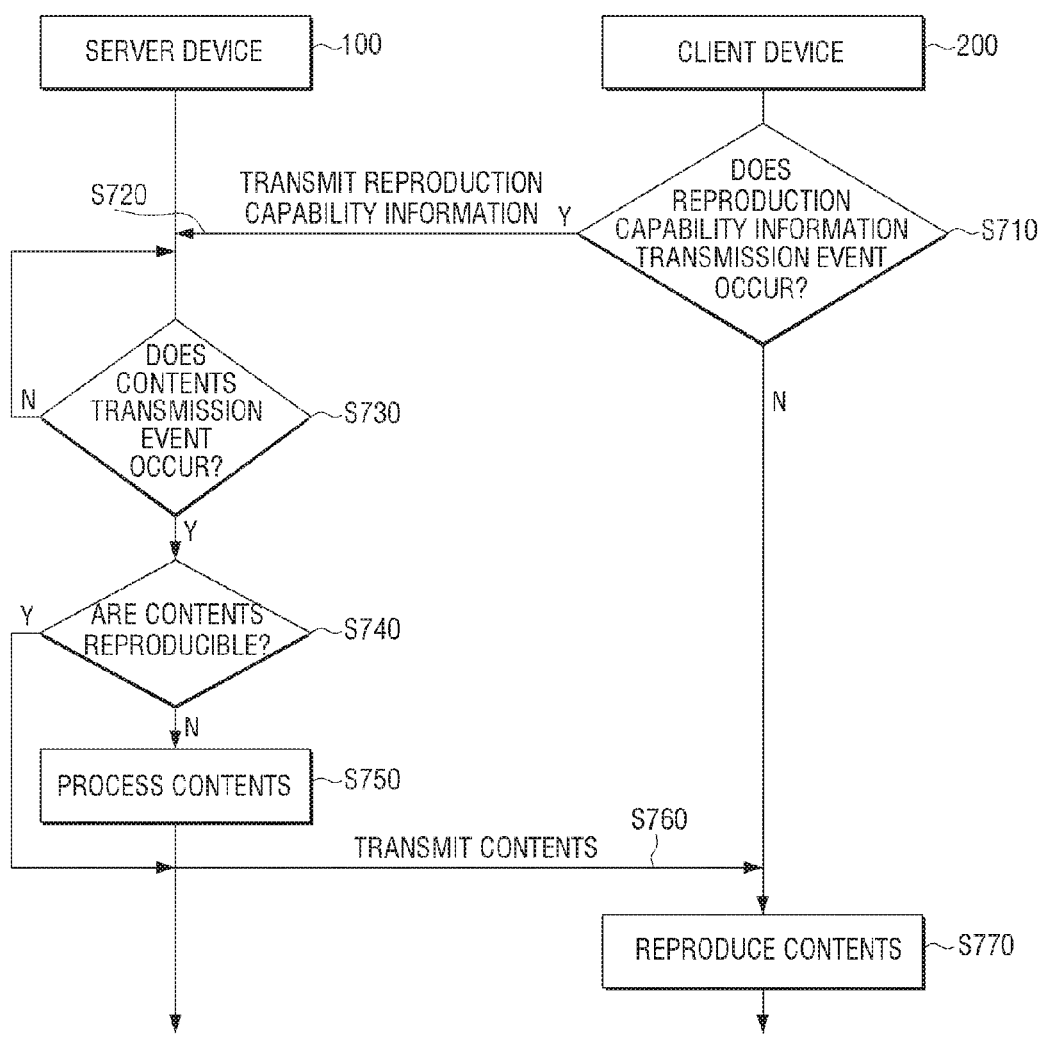
FIGS. 7 and 8 are timing diagrams illustrating a method for sharing the contents according to one or more exemplary embodiments.

FIG. 7 is a timing diagram illustrating a method for sharing the contents according to another exemplary embodiment. Referring to FIG. 7, if a reproduction capability information transmission event occurs (S710), the client device 200 transmits the reproduction capability information (S720). The reproduction capability information transmission event may be an event in which a preset time period arrives, an event in which the content sharing function is selected, an event in which the information request is transmitted from the server device 100, an event in which the client device 200 is initially connected to the server device 100, an event in which reproduction capability of the client device 200 is changed, and the like.

If the server device 100 receives the reproduction capability information, the server device 100 determines whether a contents transmission event occurs (S730). The contents transmission event is an event in which the server device 100 may need to push the contents to the client device 200. For example, if the user of the client device 200 or the server device 100 sets a contents transmission reservation, there may be an event in which a reservation time arrives, an event in which a video on demand (VOD) reservation occurs, an event in which advertisement, notice, and digital information display contents to be provided to the client device 200 occur, and the like. If the above-mentioned events occur, the server device 100 compares the reproduction capability information which is pre-transmitted and stored with the attributes of the contents to determine whether the client device 200 is in a reproducible state (S740), and processes the contents as it is according to the determination result (S750) and transmits the processed contents (S760). The client device 200 reproduces the contents transmitted from the server device 100 (S770).

As described above, FIGS. 6 and 7 illustrate one or more exemplary embodiments in which the content sharing may be performed in a state in which the content sharing request from the client device 200 does not occur. However, there may be an exemplary embodiment in which the client device 200 directly requests the contents.

Figure 8:
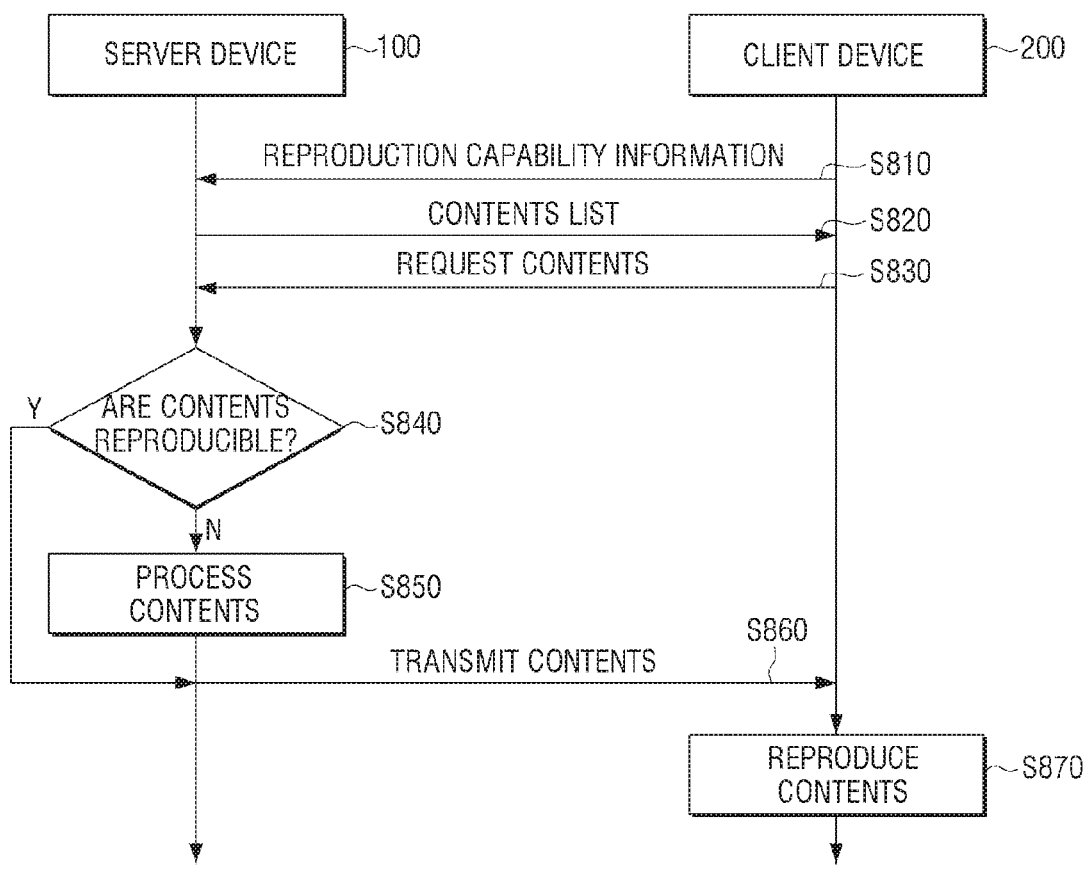

FIG. 8 is a timing diagram illustrating a method for sharing the contents according to another exemplary embodiment.

Referring to FIG. 8, the client device 200 transmits the reproduction capability information to the server device 100 (S810). The server device 100 transmits the contents list to the client device 200 that transmitted the reproduction capability information (S820).

The client device 200 displays the transmitted contents list to allow the user to select the contents. The user may select at least one from the contents list. The client device 200 may transmit the sharing request for at least one of the selected contents (S830).

If the server device 100 receives the sharing request, the server device 100 may determine whether the client device 200 may reproduce the contents based on the attribute of the requested contents and the reproduction capability information of the client device 200 (S840).

The server device 100 processes the contents as it is or appropriately according to the determination result (S850) and transmits the contents to the client device (S860). The contents transmission may be performed at once after the process for the contents is completed, and may also be performed in a manner in which a contents portion which is first processed is streamed in real time during the processing. The client device 200 reproduces the received contents (S870).

As described in the one or more exemplary embodiments above, the server device 100 may determine whether the contents may be reproduced using the reproduction capability information and the attribute of the contents, and performs the processing according to the determination result. Below, a determining method of the server device 100 and a method for processing the same will be described in detail.

Figure 9:
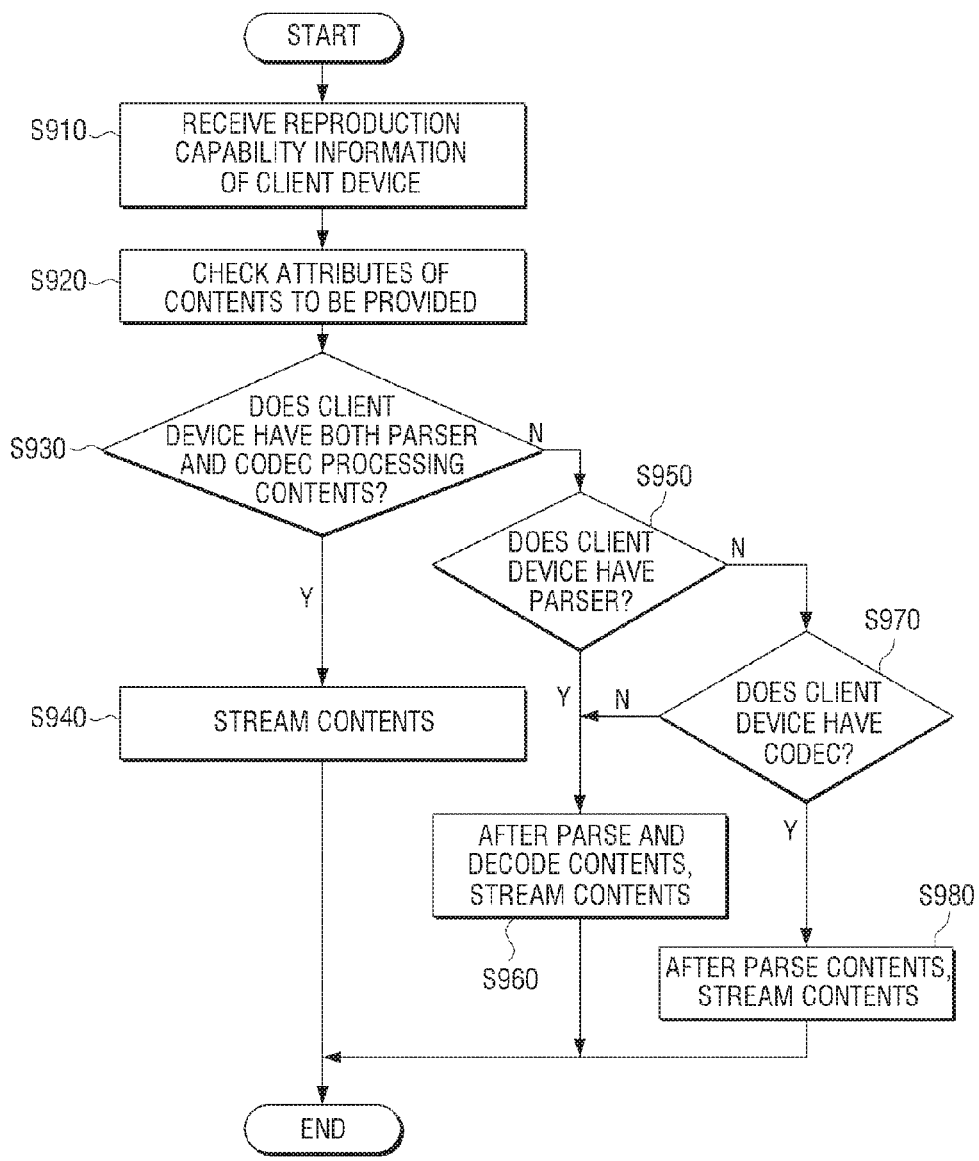
FIGS. 9 and 10 are flow charts illustrating a method for sharing the contents of the server device according to one or more exemplary embodiments.

FIG. 9 is a flow chart illustrating a method for sharing contents of the server device according to an exemplary embodiment. Referring to FIG. 9, the server device 100 receives the reproduction capability information of the client device (S910), and checks the attributes of the contents to be provided (S920). The attributes of the contents may include various information such as a contents type, codec information, a size of contents, resolution, a reproduction time, and the like.

The server device determines whether the client device has both the parser and the codec capable of processing the contents (S930).

In the case in which the contents are moving picture contents, the server device 100 determines whether the client device has a moving picture parser. The server device 100 may determine a kind of contents using an extension of a contents file and may determine the parser corresponding to the kind of contents. For example, the moving picture contents may have an extension such as AVI, MPG, TP, TS, ASF, or the like, and the image contents may have an extension such as JPEG, PNG, BMP, GIF, or the like. In addition, the audio contents may have an extension such as MP3, OGG, WMA, or the like, and the document contents may have an extension such as DOC, HWP, XLS, PPT, or the like. The server device 100 may check the extension of each contents file and then determine what parser may be used.

The server device 100 also determines whether the client device has the codec corresponding to the extension of the contents. For example, if the contents are compressed by wmv, which is a window extension, the server device 100 determines whether a wmv codec is installed in the client device. If the contents are an audio video interleave (AVI) file, the server device 100 determines whether an MPEG codec is installed in the client device, and if an extension such as DIVX, XVID, or the like, is attached to the contents, the server device 100 determines whether a DIVX codec and an XVID codec are installed in the client device. If the same codec is installed, the server device 100 also checks a version of the codec. As a result of the check, if the version is different, the server device 100 determines that the client device does not have the codec.

If it is determined that the client device has both the parser and the codec (S930), the server device 100 streams the contents as is (S940). On the other hand, if the client device has only the parser (S950: Y) or has neither the parser nor the codec (S970: N), the server device 100 parses and decodes the corresponding contents and streams the corresponding contents (S960).

If the client device does not have the parser and has only the codec (S970: Y), the server device 100 parses the contents and then streams the contents together with the parsing result (S980).

Therefore, even though the client device 200 does not have the parser or the codec, the client device 200 may reproduce the contents.

Figure 10:
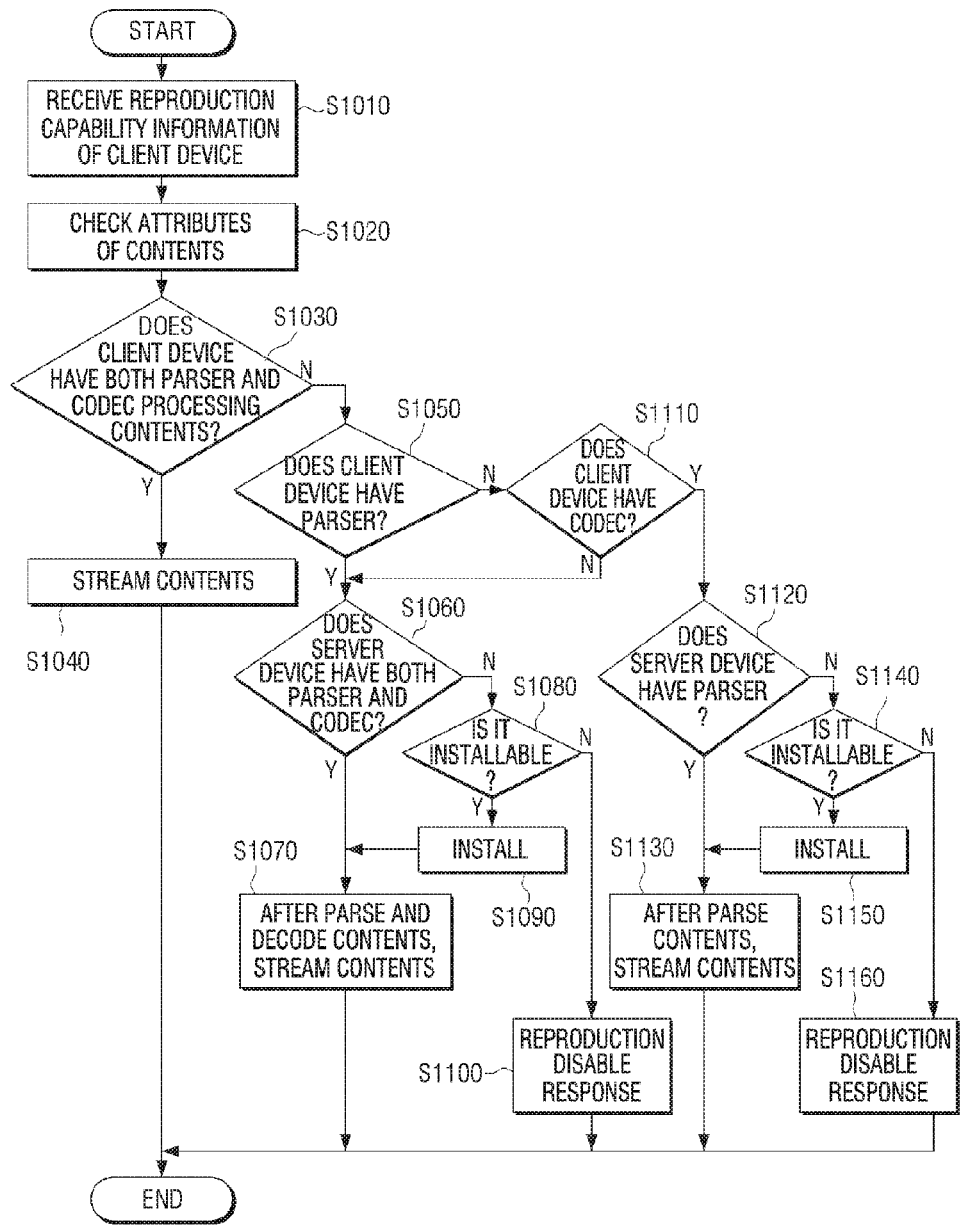

FIG. 10 is a flow chart illustrating a method for sharing contents of the server device according to another exemplary embodiment.

Referring to FIG. 10, according to a result obtained by receiving the reproduction capability information of client device (S1010), checking the attributes of the contents (S1020), and then comparing the reproduction capability information and the attributes of the contents with each other, if the client device has both the parser and the codec (S1030), the server device 100 streams the contents as is (S1040).

If the client device has only the parser (S1050: Y) or has neither the parser nor the codec (S1110: N), it is then determined whether the server device 100 has both the parser and the codec (S1060).

If the server device 100 has both the parser and the codec, the server device 100 parses and decodes the contents and streams the contents (S1070). If the server device 100 does not have both the parser and the codec, it is determined whether the parser and the codec, which are not included in the server device 100, may be installed (S1080). If the parser is not installed, the server device may search a variety of external devices connected to the server device 100 in a wired or wireless scheme, or may search the Internet for a source that may provide a parser. The codec may also be searched similarly.

If a source is found such that the parser and the codec may be installed, the server device 100 installs the corresponding parser or codec (S1090) to perform the parsing and the decoding, and streams finally processed contents to the client device 200 (S1070). If the parser and the codec may not be installed, the server device 100 transmits a reproduction disable response to the client device 200 (S1100). If the server device 100 includes an output interface such as a display unit or a speaker, the reproduction disable response may also be output from the server device 100.

If the client device does not have the parser and has only the codec (S1110: Y), it is determined whether the server device 100 has the parser (S1120). If the server device 100 has the parser, the server device 100 parses the corresponding contents and then streams the contents together with the parsing result (S1130). If the server device does not have the parser, it is determined whether the server device 100 may install the parser (S1140). If the parser may be installed, the server device 100 installs the parser (S1150) and then parses the contents to stream the parsing result and the contents to the client device 200 (S1130). If the server device 100 may not install the parser (S1140), the server device 100 transmits the reproduction disable response to the client device 200 or autonomously outputs the reproduction disable response (S1160).

As described above, even though at least one of the parser and the codec is not installed in the client device 200, reproducibility may be increased by various schemes.

Figure 11:
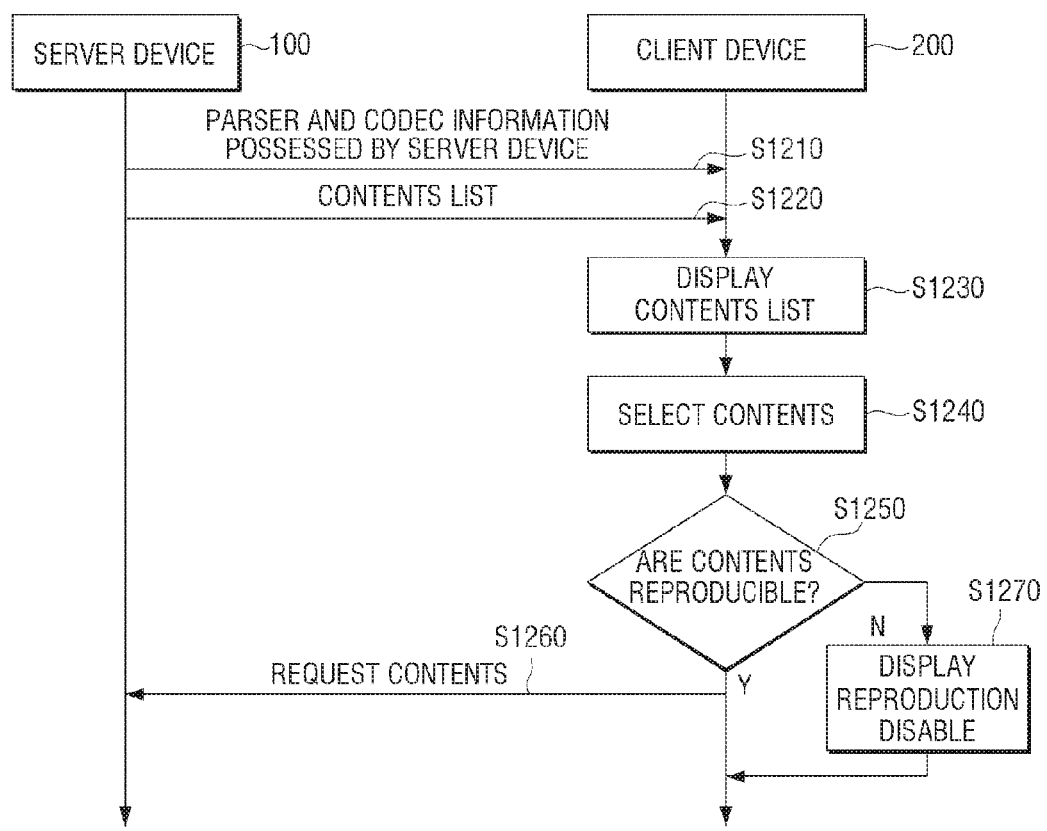
FIG. 11 is a flow chart illustrating a method for sharing the contents according to another exemplary embodiment.

FIG. 11 is a flow chart illustrating a method for sharing the contents according to another exemplary embodiment.

Referring to FIG. 11, according to an exemplary embodiment, the server device 100 may transmit the parser and codec information (S1210) and the contents list to the client device 200 (S 1220). The client device may display the contents list (S1230) and a user of the client device 200 may select the contents to be transmitted (S1240). The client device may then determine if the contents are reproducible on the client device, according to whether the client device has the appropriate parser and/or codec (S1250). If the contents are reproducible (S1250:Y), the client device 200 may request the contents from the server device 100 (S1260). If the contents are not reproducible on the client device 200 (S1250:N), the client device displays a reproduction disable response (S1270).

Figure 12:
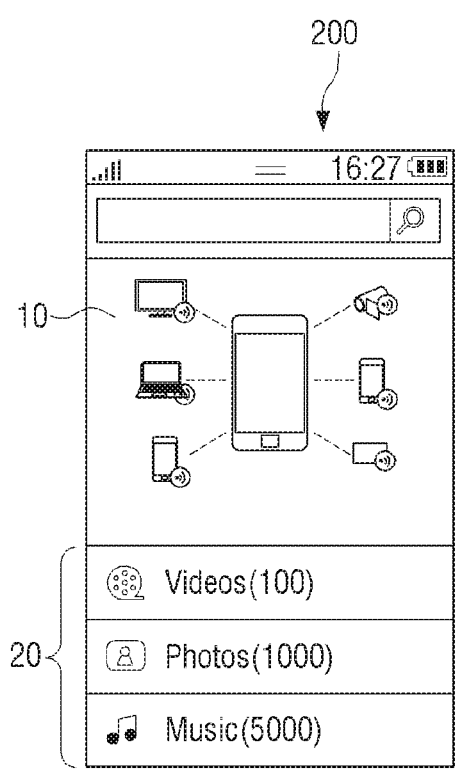
FIG. 12 is a view illustrating an example of a screen configuration for selecting the server device in a client device, according to an exemplary embodiment.
Figure 13:
FIGS. 13 and 14 are views illustrating one or more examples of a screen configuration for selecting contents to be received from the server device, according to an exemplary embodiment.
Figure 14:
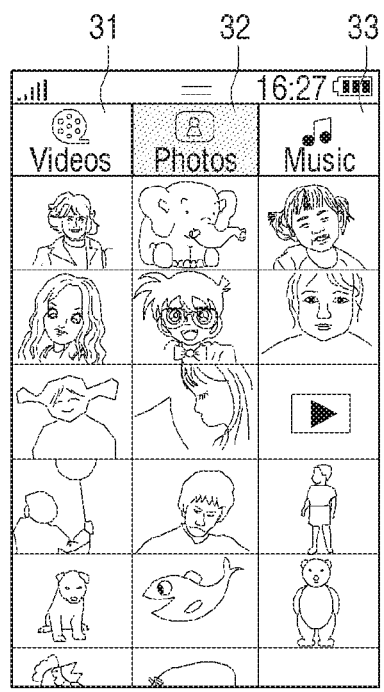

The client device 200 may display a screen having various layouts to share and reproduce the contents. FIGS. 12 to 14 illustrate examples of a screen displayed on the client device 200.

Referring to FIG. 12, the client device 200 displays a screen including a first display region 10 for displaying a variety of devices which are communicatively connected to each other and a second display region 20 for displaying a type and a number of contents searched through network.

The first display region 10 displays icon images for the respective devices connected to each other on the basis of the client device 200. The images displayed on the first display region 10 may also include the different number of icon images as well as the number of searched devices, and may also be a fixed image viewed as a default when the content sharing function is executed.

The second display region 20 displays categories which are classified into a plurality of different content types such as a video category, a photo category, and a music category, and also displays the number of contents belonging to the above-mentioned categories.

The user may select one category from the second display region 20 to check a list of the contents belonging to the selected category.

FIG. 13 illustrates a screen displayed when the video category among the categories of the second display region 20 is selected. Referring to FIG. 13, tabs 31, 32, and 33 for the respective categories are displayed on an upper end portion of the screen.

In addition, information about a type of contents belonging to the tab 31 which is currently selected is displayed below the tabs 31, 32, and 33 in a list form. The above-mentioned list may be created based on contents information provided from the respective searched server devices. The content information may be various information such as a representative image or text, a full running time, a thumbnail view, a manufacturer, a providing device name, and the like. FIG. 13 illustrates a state in which a thumbnail view, a description, a full running time, and the like for the respective contents are displayed on the list.

The content information may be implemented in various forms in addition to the list form illustrated in FIG. 13. For example, a list in which the representative image is not displayed and only the text is displayed may be displayed.

In addition, as illustrated in FIG. 14, thumbnail views for the respective contents may also be displayed. FIG. 14 illustrates a case in which the tab 32 corresponding to the photo category is selected from the tabs 31, 32, and 33.

Referring to FIG. 14, the thumbnail views of a variety of photo contents belonging to the photo category are arranged in a matrix form.

The user may select one of a variety of contents displayed as illustrated in FIGS. 13 and 14. If the contents are selected, the client device 200 transmits the content sharing request to the server device 100 capable of providing the selected contents. In this case, the client device 200 may also transmit the content reproduction capability. In addition to the contents reproduction capability, the transmission may be performed at various timings.

Figure 15:
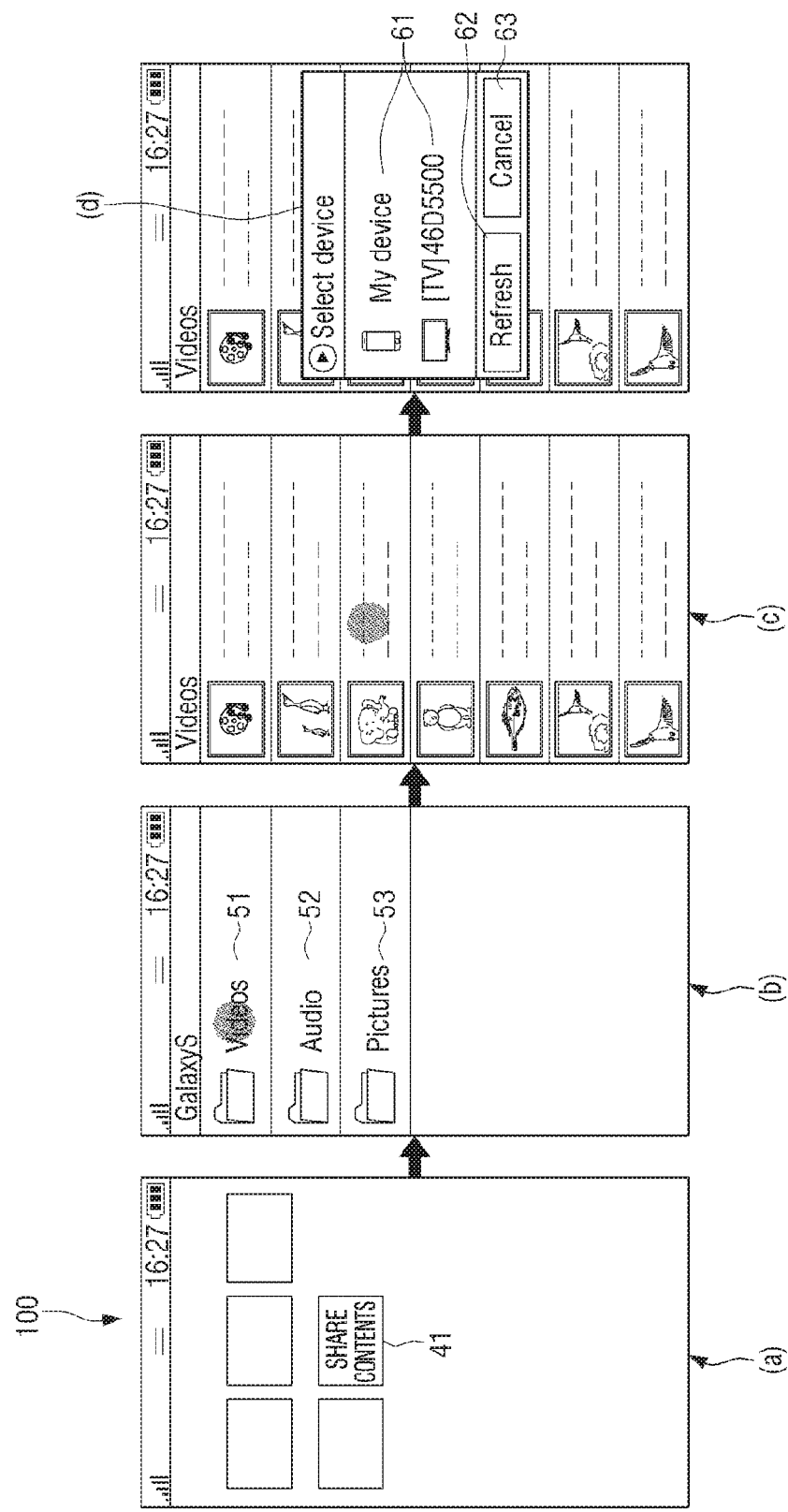
FIG. 15 is a view illustrating an example of a screen configuration for selecting the client device in the server device to allow the contents to be shared between the server device and the client device, according to an exemplary embodiment.

FIG. 15 is a view illustrating screens displayed by the server device 100 to perform the content sharing.

Referring to FIG. 15, the server device 100 displays a background screen (a) including a plurality of icons. In this state, if an icon 41 corresponding to the content sharing function is selected, the server device 100 displays a screen (b) on which a plurality of categories obtained by classifying prestored contents according to a type of contents are displayed.

Although FIG. 15 illustrates a state in which the screen (b) includes a video category 51, an audio category 52, and a photo category 53 is displayed, exemplary embodiments are not limited to these categories.

In this state, as illustrated in FIG. 15, if the video category 51 is selected, a screen (c) in which video contents belonging to the video category 51 are arranged in a list form is displayed. The user may touch and select one of the video contents.

If one of the contents is selected on the screen (c), a popup window (d) for selecting an object reproducing the selected contents is displayed. The popup window (d) may include an information display region 61 on which information about a variety of devices connected to the server device 100 is displayed, including the server device 100 itself, a menu 62 for performing a refresh, a menu 63 for canceling the device selection, and the like.

If the user selects one device on the information display region 61 in the popup window (d), the selected device becomes the client device. That is, the server device 100 checks the reproduction capability information of the selected client device and attributes of the selected contents to determine whether the client device may reproduce the contents. As a result, the server device 100 transmits the contents as is, or performs the parsing or the decoding for the contents and then transmits the parsed or decoded contents.

Although FIG. 15 illustrates a case in which the contents are summarized and displayed in the list form, the video contents may also be displayed in a thumbnail view using the representative image as illustrated in FIG. 14. Exemplary embodiments are not limited to these forms.

As described above, the server device 100 and the client device 200 may share the contents by various schemes. As described above, the server device 100 may be implemented in various forms of devices. Therefore, according to an exemplary embodiment, the components included in the server device 100 may be added or modified, and some thereof may be omitted.

Figure 16:
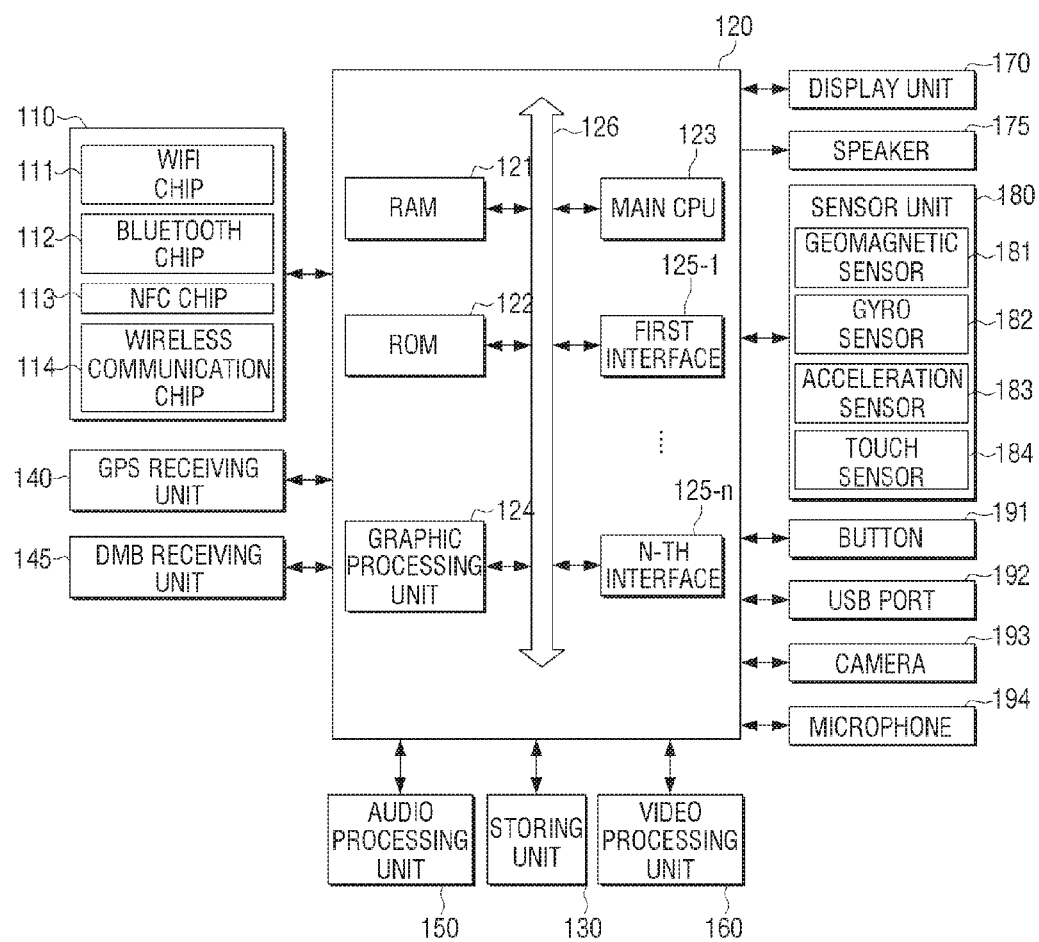
FIG. 16 is a block diagram illustrating a configuration of a server device according to one or more exemplary embodiments.

FIG. 16 is a block diagram illustrating a configuration of the server device 100 according to one or more exemplary embodiments.

Referring to FIG. 16, the server device 100 includes the communication unit 110 (e.g., communicator), the controlling unit 120 (e.g., controller), the storing unit 130 (e.g., storage or memory), a GPS receiving unit 140 (e.g., GPS receiver), a DMB receiving unit 145 (e.g., DMB receiver), an audio processing unit 150 (e.g., audio processor), a video processing unit 160 (e.g., video processor), a display unit 170 (e.g., display), a speaker 175, a sensor unit 180, a button 191, a USB port 192, a camera 193, and a microphone 194.

The communication unit 110 may include hardware according to various communication schemes such as a Wi-Fi chip 111, a Bluetooth chip 112, an NFC chip 113, a wireless communication chip 114, and the like. These chips may also be used by being integrated into one-chip at the time of the implementation, and may also be used as separate chips, respectively, as illustrated in FIG. 16.

The WiFi chip 111, the Bluetooth chip 112, and the NFC chip 113 perform communication in a WiFi scheme, a Bluetooth scheme, and an NFC scheme, respectively. Among these chips, the NFC chip 113 is a chip which is operated in the NFC scheme using a frequency band of 13.56 MHz of various RF-ID frequency bands such as 135 kHz, 13.56 MHz, 433 MHz, 860 to 960 MHz, 2.45 GHz, and the like. In the case in which the NFC chip 113 is used, the client device 200 may need to first have an NFC tag. Therefore, if the user moves the server device 100 or the client device 200 to be located within a range (e.g., 10 cm) in which the server device 100 and the client device 200 may communicate with each other, the server device 100 reads the reproduction capability information recorded in the NFC tag by the NFC chip 113. In this scheme, the server device 100 and the client device 200 may transmit and receive various information as well as the reproduction capability information to and from each other. In the case in which the Wi-Fi chip 111 or the Bluetooth chip 112 is used, a variety of access information may be first transmitted and received, a communication access may be performed using the variety of access information, and a variety of information may be then transmitted and received.

The wireless communication chip 114 may perform wireless communication in various schemes using a mobile communication network such as 3G, 4G, or the like, or using an Internet network.

The communication unit 110 may perform communication with a variety of external devices including the client device 200 using the chips having various configurations described above. The communication unit 110 may receive the reproduction capability information, the content sharing request, and the like, from the client device 200.

The GPS receiving unit 140 is a component receiving a global positioning system (GPS) signal from a GPS satellite to calculate a current position of the server device 100. The DMB receiving unit 145 is a component receiving and processing a digital multimedia broadcasting (DMB) signal.

The audio processing unit 150 is a component performing the processing for audio data. The audio processing unit 150 may perform various processes such as decoding, amplification, noise filtration, etc., for the audio data.

The video processing unit 160 is a component performing the processing for video data. The video processing unit 160 may perform various image processes such as decoding, scaling, noise filtration, frame rate conversion, resolution conversion, etc., for the video data. The codec described above may be implemented by hardware and/or software. The video processing unit 160 may include the codec implemented by hardware, and may perform encoding or decoding for the video data.

The display unit 170 displays various screens or objects according to a control of the controlling unit 120. In the case in which the server device 100 initiates the content sharing function, a screen for selecting the contents to be shared, or a screen for selecting the client device may be displayed on the display unit 170.

The speaker 175 may output a variety of alarm sounds or voice messages as well as a variety of audio data processed by the audio processing unit 150.

The sensor unit 180 is a component for sensing a manipulation content of the user for the server device 100, a state of the server device 100, or the like. The sensor unit 180 may include various sensors such as a geomagnetic sensor 181, a gyro sensor 182, an acceleration sensor 183, a touch sensor 184, and the like.

The geomagnetic sensor 181 is a sensor sensing a change in a surrounding geomagnetic using a two-axis or three-axis flux gate. The controlling unit 120 may calculate an azimuth using a geomagnetic value sensed by the geomagnetic sensor 181. As a result, the controlling unit 120 may determine whether the server device 100 is rotated in which direction. The acceleration sensor 183 is a sensor that may measure acceleration and a direction of the acceleration at the time of a motion occurrence. The acceleration sensor 183 outputs a sensing value corresponding to acceleration of gravity changed according to a gradient of the server device 100 to which the acceleration sensor 183 is attached. The controlling unit 120 may determine the gradient of a moving object using an output value of the acceleration sensor 183. The gyro sensor 182 is a sensor detecting angular speed by measuring Coriolis' force acting in a speed direction of a rotary motion in the case in which the rotary motion occurs. The controlling unit 120 may also detect a rotation of the server device 100 using a measuring value of the gyro sensor 182. The touch sensor 184 may be connected to the display unit 170 to sense a touch manipulation of the user. The touch sensor 184 may be implemented in a capacitive type or a resistive type. The touch sensor of the capacitive type is a sensor using a dielectric coated on the surface of the display unit 170 and calculating a touch coordinate by sensing micro-electricity exited into a body of the user when a portion of the body of the user touches a surface of the display unit 170. The touch sensor of the resistive type is a touch sensor including two electrode plates embedded in the display unit 170 and calculating the touch coordinate by sensing the fact that upper and lower plates of a touched point are in contact with each other to allow a current to flow when the user touches the screen. The sensor unit 180 detects a coordinate of a point touched by the user by the touch sensor and provides the detected coordinate to the controlling unit 120.

The controlling unit 120 may perform various control operations according to a variety of sensing signals provided from the sensor unit 180. That is, if the coordinate value of the point touched by the touch sensor 184 corresponds to a coordinate displaying a content sharing icon, the controlling unit 120 recognizes that the content sharing function is selected and executes a program corresponding to the content sharing function. In addition, in a case in which the server device 100 is rotated in a horizontal direction or a vertical direction by the geomagnetic sensor 181, the gyro sensor 182, the acceleration sensor 183, and the like, the controlling unit may also perform an operation changing the screen according to the rotation direction. In addition, the controlling unit may detect an intention of the user according to the motion of the server device 100 sensed by the geomagnetic sensor 181, the gyro sensor 182, and the acceleration sensor 183 to execute the content sharing function.

The server device 100 may further include various components such as the button 191, the USB port 192, the camera 193, the microphone 194, and the like. The button 191 may be various types of buttons such as a mechanical button, a touch pad, a wheel, etc., formed in any region such as a front part, a side part, a rear part, or the like of the exterior of a body of the server device 100. The USB port 192 is a port to which an USB memory or an USB connector may be connected. The server device 100 may search the contents stored in the external devices connected by a variety of connection ports as well as the USB port 192 to check whether the contents may be shared.

In a case in which the camera 193 and the microphone 194 are provided, the controlling unit 120 may also perform a control operation according to the user voice input through the microphone 194 or a user motion recognized by the camera 193. That is, the server device 100 may be operated in a motion control mode or a voice control mode. In the case in which the server device 100 is operated in the motion control mode, the controlling unit 120 activates the camera 193 to photograph the user, and tracks a change in the motion of the user to perform a control operation corresponding to the change in the motion. If it is determined that the user performs the motion corresponding to the content sharing function, the controlling unit 120 may search the stored contents and may display the screen (a) as illustrated in FIG. 15 on the display unit 170. Alternatively, if it is determined that the user pronounces a voice corresponding to the content sharing function by analyzing the user voice input from the microphone 194, the controlling unit 120 may also display the screen (a) as illustrated in FIG. 15.

The operations of the controlling unit 120 described above may be performed by a program stored in the storing unit 130.

That is, the storing unit 130 stores various data such as operating system (O/S) software for driving the server device 100, an application for performing the content sharing function, a variety of data input or set during an application execution, the contents, and the like. The controlling unit 120 may control the operation of the server device 100 using a variety of programs stored in the storing unit 130.

The controlling unit 120 includes a random access memory (RAM) 121, a read only memory (ROM) 122, a main central processing unit (CPU) 123, a graphic processing unit 124, first to n-th interfaces 125-1 to 125-n, and a bus 126.

The RAM 121, the ROM 122, the main CPU 123, the graphic processing unit 124, the first to n-th interfaces 125-1 to 125-n, and the like may be connected to each other through the bus 138 to transmit and receive a variety of data or signals.

The first to n-th interfaces 125-1 to 125-n may be connected to other components as well as a variety of components illustrated in FIG. 16, to allow the main CPU 123 to access the components.

The main CPU 123 accesses the storing unit 130 and performs the booting using the O/S stored in the storing unit 130. In addition, the main CPU 123 performs various operations using a variety of programs, contents, data, and the like stored in the storing unit 130.

The ROM 122 stores a set of instructions for booting a system. When a turn-on instruction is input to the main CPU 123 to supply power, the main CPU 123 copies the O/S stored in the storing unit 130 in the RAM 121 according to the instructions stored in the ROM 122 and executes the O/S to boot the system. When the booting of the system is completed, the main CPU 123 copies a variety of application programs stored in the storing unit 130 in the RAM 121 and executes the application programs copied in the RAM 121 to perform a variety of operations.

The graphic processing unit 124 configures a variety of screens according to a control of the main CPU 123. The graphic processing unit 124 may display the screens (a), (b), and (c) as illustrated in FIG. 15. The graphic processing unit 124 calculates display state values for the screens. The display state value may be a coordinate value of a position at which the object is to be displayed on the screen, attribute values indicating a shape, size, color, and the like of the object, and the like. If the display state values are calculated, the graphic processing unit 124 performs rendering based on the calculated display state values to generate the screens.

If it is determined that the user inputs a content sharing instruction by the sensor unit 180 or the button 191, the main CPU 123 searches the contents stored in the storing unit 140 and controls the graphic processing unit 124 to generate the screen corresponding to the search result.

As described above, the controlling unit 120 may copy and execute the program stored in the storing unit 130 in the RAM 121 to perform various operations.

Figure 17:
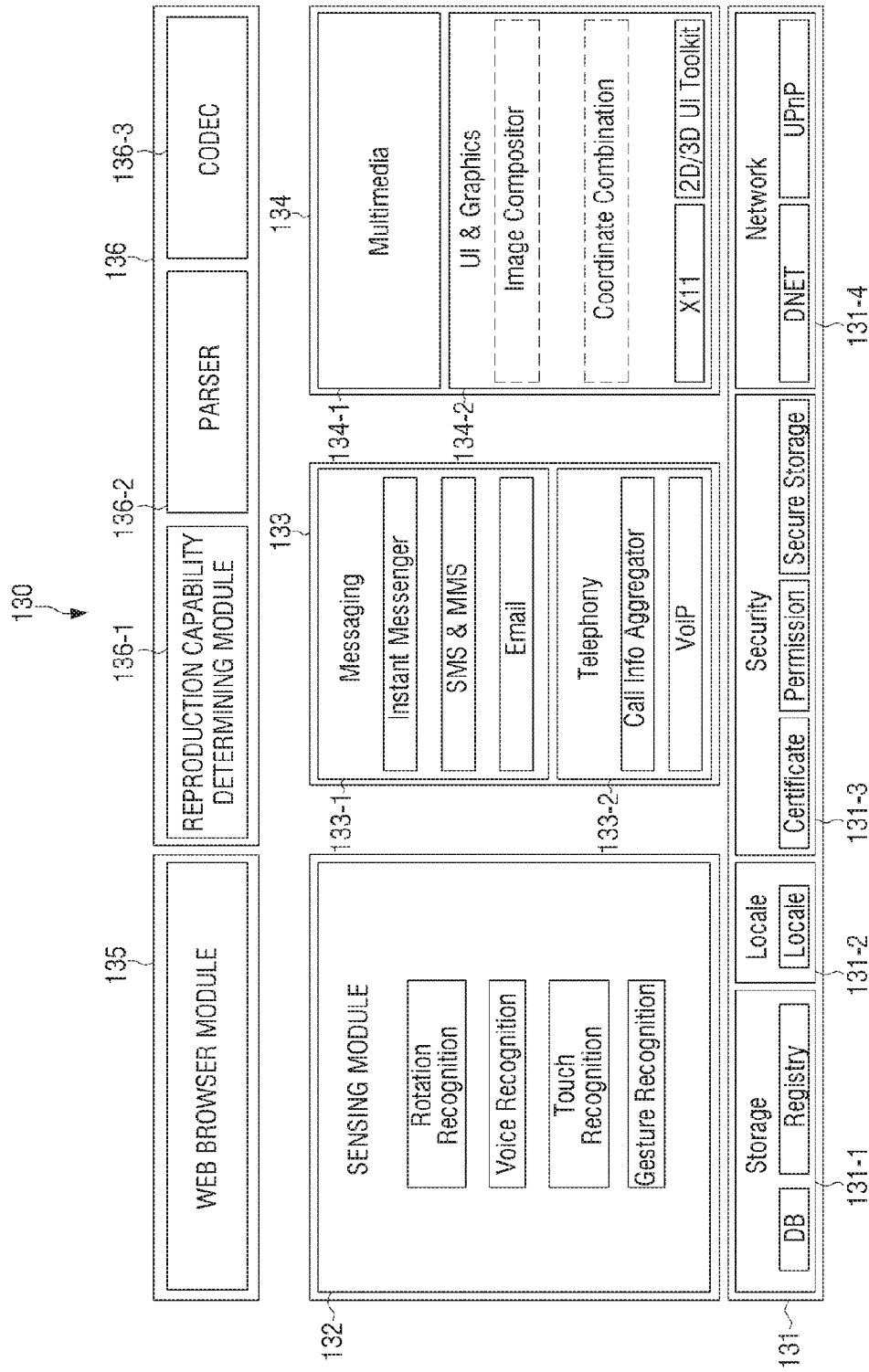
FIG. 17 is a view illustrating an example of a configuration of program used in the server device of FIG. 16, according to an exemplary embodiment.

FIG. 17 is a view illustrating a layer of software stored in the storing unit 130. Referring to FIG. 17, the storing unit 130 includes a base module 131, a sensing module 132, a communication module 133, a presentation module 134, a web browser module 135, and a contents processing module 136.

The base module 131 is a basic module processing signals transferred from the respective hardware included in the server device 100 and transferring the signals to a high layer module.

The base module 131 includes a storage module 131-1, a location based module 131-2, a security module 131-3, a network module 131-4, and the like.

The storage module 131-1 is a program module managing a database (DB) or a registry. The main CPU 123 may access the database in the storing unit 130 using the storage module 131-1 to read a variety of data. The location based module 131-2 is a program module supporting a location based service by interworking with a variety of hardware such as the GPS chip, and the like. The security module 131-3 is a program module for supporting certification, request permission, secure storage, and the like for hardware, and the network module 131-4, which is a module for supporting a network connection, includes a DNET module, an UPnP module, and the like.

The sensing module 132 is a module for managing information about an external input and an external device and using the information. The sensing module 132 includes a rotation recognition module, a voice recognition module, a touch recognition module, and a gesture recognition module. The rotation recognition module is a program calculating a rotation angle and a rotation direction using the sensing values sensed by the sensors such as the geomagnetic sensor 181, the gyro sensor 182, and the like. The voice recognition module is a program extracting a voice of the user by analyzing a voice signal collected by the microphone 194, the touch sensing module is a program detecting a touch coordinate using the sensing value sensed by the touch sensor 184, and the gesture recognition module is a program recognizing a gesture of the user by analyzing an image photographed by the camera 193.

The communication module 133 is a module for performing communication with the outside. The communication module 133 may include a messaging module 133-1 such as a messenger program, a short message service (SMS) & multimedia message service (MMS) program, an e-mail program, or the like, and a call module 133-2 including a call info aggregator program module, a VoIP module, and the like.

The presentation module 134 is a module for configuring a display screen. The presentation module 134 includes a multimedia module 134-1 for reproducing and outputting multimedia contents and a UI & graphic module 134-2 performing a UI and graphic processing. The multimedia module 134-1 may include a player module, a camcorder module, a sound processing module, and the like. Therefore, the multimedia module 134-1 reproduces a variety of multimedia contents to perform an operation of generating and reproducing the screen and the sound. The UI & graphic module 134-2 may include an image compositor module combining images, a coordinate combining module combining and generating a coordinate of the screen at which the image is to be displayed, an X11 module receiving a variety of events from hardware, a 2D/3D UI toolkit providing a tool for configuring a 2D or 3D type of UI, and the like.

The web browser module 135 is a module performing a web browsing to access a web server. The web browser module 135 may include various modules such as a web view module configuring a web page, a download agent module performing a download, a bookmark module, a webkit module, and the like.

The contents processing module 136 is software for processing the contents stored in the storing unit 130. A reproduction capability determining module 136-1 is a program operated by an algorithm comparing the reproduction capability information and the attributes of the contents with each other. A parser 136-2 and a codec 136-3 are software provided to the video processing unit 160 to process the contents. The parser 136-2 may be implemented by software, and the codec 136-3 may be implemented by hardware and/or software.

The storing unit 130 may further include various application modules such as a navigation service module, a game module, and the like.

A variety of program modules illustrated in FIG. 17 may be omitted, modified, or added depending on a kind of server device 100 and characteristics of the server device 100. If the server device 100 is a TV, the storing unit 130 may further include a broadcast receiving module. Alternatively, the storing unit 130 may further include an e-book application, a game application, and other utility programs. In addition, some of the program modules illustrated in FIG. 17 may be omitted.

The configuration as illustrated in FIG. 16 may also be applied to the server devices disclosed in one or more exemplary embodiments described above. In addition, the components illustrated in FIG. 16 may be omitted, modified, or added depending on a kind of server device 100 and characteristics of the server device 100. If the server device 100 is the TV, the server device 100 may further include hardware such as an antenna or a tuner.

Although FIG. 16 describes the configuration of the server device 100, as described above, the server device 100 and the client device 200 may also be implemented by a user terminal of the same kind or a similar kind of user terminals. In this case, the configuration of FIG. 16 may also be applied to the client device 200.

The exemplary embodiments described above may be implemented in a virtual desktop interface (VDI) environment. The virtual desktop interface is an environment in which the server device connected to several client devices configures the screen to be displayed and then provides the configured screen to each client device to allow the user of each client device to check the screen. The VDI environment may be applied to a conference room, a public place, and the like for sharing the screen with a plurality of users.

Figure 18:
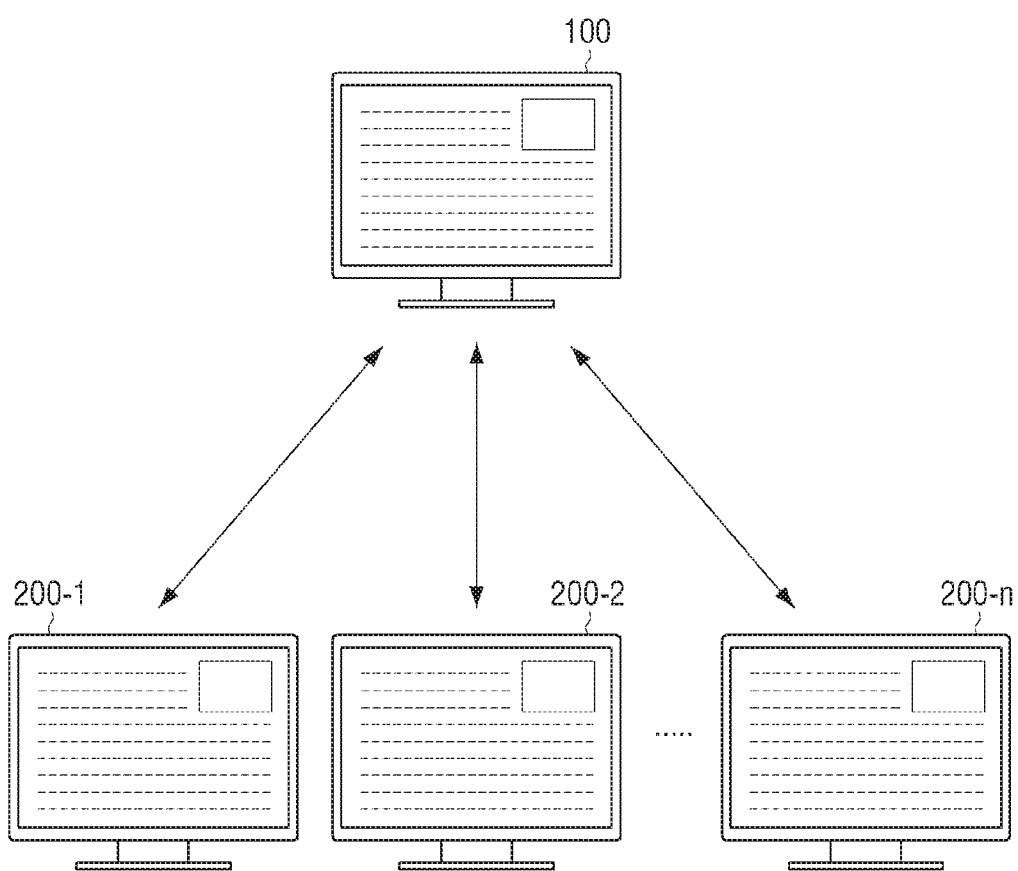
FIG. 18 is a view illustrating a configuration of a screen sharing system according to an exemplary embodiment.

FIG. 18 is a view illustrating a configuration of a screen sharing system according to an exemplary embodiment. Referring to FIG. 18, the screen sharing system includes the server device 100 and a plurality of client devices 200-1 to 200-n.

The server device 100 configures the screen according to a manipulation of the user and then provides the configured screen to the respective client devices 200-1 to 200-n. The respective client devices 200-1 to 200-n display the provided screen. A list for various contents such as video contents, still image contents, a document, audio contents, and the like, may be displayed on the screen. The users of the respective client devices 200-1 to 200-n may select the contents by touching the screen of the client device, or clicking a point on the screen by an input interface such as a mouse, a keyboard, a joystick, or the like, connected to the corresponding client device.

The respective client devices 200-1 to 200-n transmit a coordinate value for the touch point or the click point to the server device 100. The server device 100 determines which point on the screen of each of the client devices 200-1 to 200-n is selected, base on a display size and an aspect ratio of each of the client devices 200-1 to 200-n. Therefore, the server device 100 transmits the contents corresponding to the contents information displayed on the selected point to each of the client devices 200-1 to 200-n. If a first client device 200-1 selects first contents, the server device 100 transmits the first contents to the first client device 200-1, and if a second client device 200-2 selects second contents, the server device 100 transmits the second contents to the second client device 200-2.

The respective client devices 200-1 to 200-n directly reproduce the transmitted contents. As a result, a processing load and a network resource load in the server device 100 may be reduced. In addition, because the respective client devices 200-1 to 200-n directly reproduce the contents, quality of original contents may be maintained.

However, there may be a case in which some of the client devices do not have reproduction capability for the selected contents. The server device 100 checks reproduction capability information of the client devices to determine whether the client devices have the reproduction capability. The reproduction capability information may be provided at various timings as described above.

The server device 100 receives the reproduction capability information from the client devices 200-1 to 200-n periodically or at the time of selecting the contents. The server device 100 determines whether the respective client devices 200-1 to 200-n may reproduce the corresponding contents based on the received reproduction capability information. If the client devices may reproduce the contents, the server device 100 transmits the contents to the respective client devices 200-1 to 200-n as it is. On the other hand, if the client devices may not reproduce the contents, the server device 100 converts the contents into a reproducible form and transmits the converted contents. For example, after the server device 100 performs a task such as the parsing or the decoding, the server device 100 transmits the parsed or decoded contents.

Figure 19:
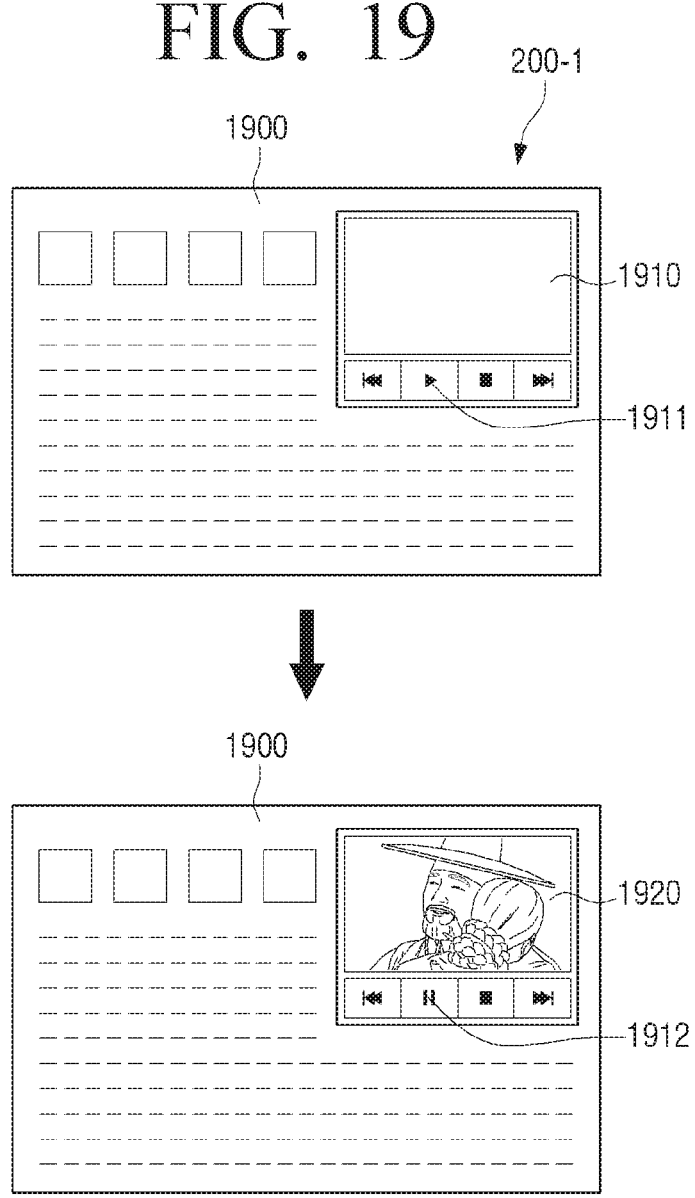
FIG. 19 is a view illustrating an example of a screen of the client device used in the screen sharing system, according to an exemplary embodiment.

FIG. 19 is a view illustrating a configuration of the screen displayed on one of the client devices used in the screen sharing system of FIG. 18. For convenience of explanation, FIG. 19 will be described based on the first client device 200-1 of the plurality of client devices 200-1 to 200-n.

Referring to FIG. 19, the client device 200-1 displays a screen 1900 provided from the server device 100 as is. The screen 1900 may include a reproduction region 1910 for displaying a reproduction result of multimedia contents.

The reproduction region 1910 maintains an inactive state. The inactive state is a state in which no contents are displayed on the reproduction region 1910. In the inactive state, a phrase or an image for informing the inactive state may be displayed on the reproduction region 1910.

If it is determined that the user selects a reproduction button 1911 below the reproduction region 1910, the server device 100 transmits requested contents to the client device 200-1. In this case, the server device 100 also transmits coordinate information at which a contents reproduction screen is to be displayed to the client device 200-1. In FIG. 19, a coordinate value corresponding to a corner region of the reproduction region 1910 may be transmitted to the client device 200-1.

The client device 200-1 reproduces the contents using the parser, the codec, and the like, and then overlays a reproduced screen on an original screen 1900. An overlay position may be determined based on coordinate information provided from the server device 100. As a result, the client device 200-1 overlays the reproduced screen 1920 on the reproduction region 1910 within the original screen 1900. In addition, a variety of button buttons 1912 for controlling a content reproduction state are displayed below the reproduced screen 1920. While the contents reproduction is performed, the reproduction button menu 1911 may be changed to a pause button menu 1912.

If the client device 200-1 directly reproduces the contents, a resource consumption of a server may be reduced and image quality of the original contents may be implemented as is. However, as described in one or more exemplary embodiments, the client device 200-1 may not have the parser and the codec for reproducing the contents. In this case, the server device 100 may perform at least one processing of parsing and decoding for the corresponding contents. If only the parsing processing is performed, the server device 100 transmits a parsing result to the client device 200-1, and the client device 200-1 decodes the parsed contents to generate the screen 1920. In addition, the client device 200-1 overlays the generated screen 1920 on the reproduction region 1910. If the decoding processing is also performed, the server device 100 generates the screen itself generated by the decoding and transmits the screen to the client device 200-1. The client device 200-1 overlays the generated screen on the reproduction region 1910. Alternatively, the server device 100 may add the contents reproduction screen to the original screen 1900 to configure one screen and then transmit an overall screen.

Although one or more exemplary embodiments described above have been described based on a method for processing one of the contents, a method for processing other additional contents may also be implemented.

Figure 20:
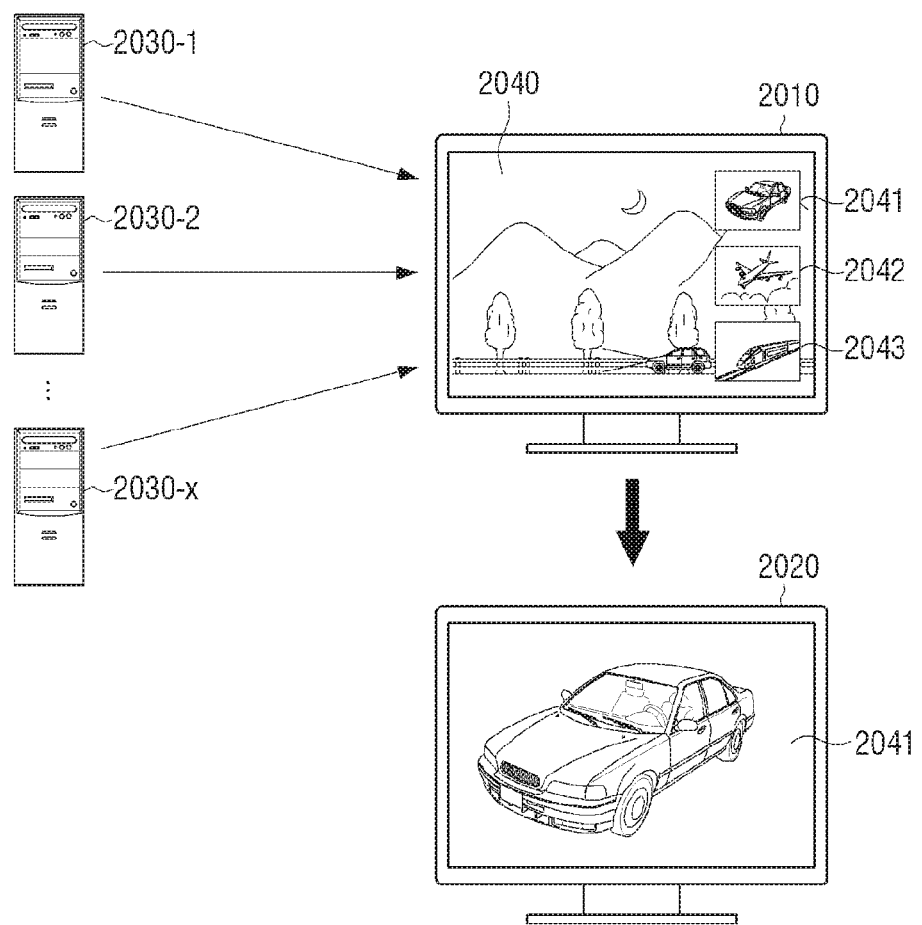
FIG. 20 is a view illustrating a configuration of a contents providing system according to another exemplary embodiment.

FIG. 20 illustrates an example of a configuration of a content providing system according to another exemplary embodiment. Referring to FIG. 20, the content providing system includes a first display device 2010 and the second display device 2020.

The first display device 2010 reproduces the contents provided from one of a plurality of external sources 2030-1 to 2030-x or a separate source to display a reproduced screen 2040. In addition, the first display device 2010 may display additional images 2041, 2042, and 2043 provided from the respective external sources 2010-1 to 2010-x. The additional images may be displayed on one side of the screen at a size smaller than a main image screen 2040.

As such, in the case in which there are the plurality of external sources 2030-1 to 2030-x providing the additional images, the codec and the parser for processing the respective additional images may also be variously used. Therefore, there may be the additional image that may not be reproduced by the first display device 2010. In this case, the external source providing the additional image may perform the processing such as the parsing, the decoding, and the like, for the additional image and provide the processed additional image.

If one of the additional images is selected, the first display device 2010 may forward the selected additional image to the second display device 2020. FIG. 20 illustrates the case in which when a first additional image 2041 is selected, an enlarged image for the corresponding additional image is displayed on the second display device 2020. The first and second display devices 2010 and 2020 may be connected to each other by various interfaces such as WiFi, Bluetooth, IEEE. Zigbee, HDMI, USB, and the like.

If the additional image is selected, the first display device 2010 may transmit additional image contents itself to the second display device 2020 to allow the second display device 2020 to directly reproduce the additional image. However, there may also be the case in which the first display device 2010 may process the additional image, but the second display device 2020 may not process the additional image. In this case, the first display device 2010, not the external source, may parse and decode the corresponding additional image contents to provide the parsed and decoded additional image contents to the second display device 2020.

The additional images described above may be associated with the main image. For example, there may also be an image obtained by capturing a certain scene included in the main image, images for characters, places, and products involved in the main image, an advertisement image, and the like. In addition, external sources 2030-1 to 2030-x may also be implemented by a web server connected through Internet. In this case, the main image may include uniform resource locators (URL) of the external sources 2030-1 to 2030-x providing the additional images. The first display device 2010 may access the respective external sources 2030-1 to 2030-x using the URL to receive the additional images. The external sources 2030-1 to 2030-x may also be implemented by a terminal or a server connected through various communication interfaces. In this case, IP addresses of the external sources 2030-1 to 2030-x may be included in the main image.

The source providing the main image provides information about the first display device 2010 to the respective external sources 2030-1 to 2030-x, such that the respective external sources 2030-1 to 2030-x may push the additional images to the first display device 2010.

Although FIG. 20 illustrates a case in which the additional images are each provided from the plurality of external sources, even in the case in which one server device 100 provides the contents to the client device 200, the server device 100 may further provide additional contents in addition to the corresponding contents. In this case, even in the case in which the client device 200 has the contents reproduction capability, the server device 100 may also parse and decode at least a simple thumbnail image to directly provide the parsed and decoded thumbnail image to the client device 200. That is, while the client device 200 reproduces the main contents, the server device 100 may parse and decode a variety of additional images to configure an additional image screen and then provide the additional image screen to the client device 200.

The content providing system described above may also be implemented as a home gateway system.

Figure 21:
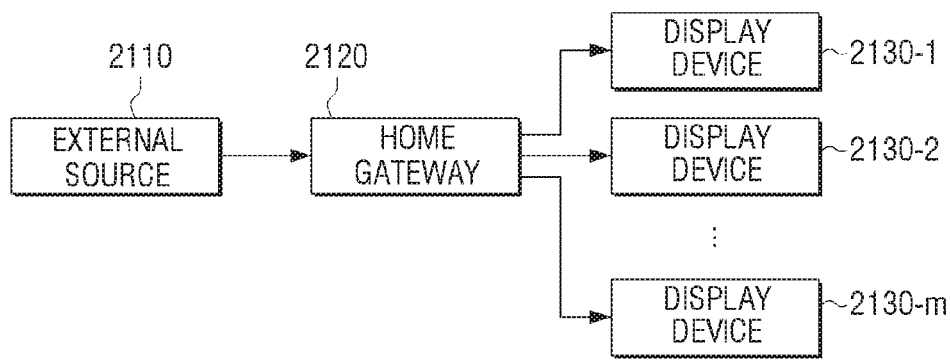
FIG. 21 is a view illustrating a configuration of a home gateway system according to another exemplary embodiment.

FIG. 21 illustrates an example of a home gateway system according to an exemplary embodiment. Referring to FIG. 21, the home gateway system includes a home gateway 2120 and a plurality of display devices 2130-1 to 2130-m.

The respective display devices 2130-1 to 2130-m may be implemented as a dummy type of display device having bad system performance. The home gateway 2120 may transmit the contents provided from an external source 2110 to the respective display devices 2130-1 to 2130-m.

In this case, the home gateway 2120 may perform different contents processing according to the contents reproduction capability of the respective display devices 2130-1 to 2130-m. For example, in the case of the display device that may reproduce the contents, the home gateway 2120 transmits the contents in an encoded state transmitted from the external source 2110 as is. In the case of the display device that may not reproduce the contents, the home gateway 2120 may perform the parsing and the decoding for the contents and then transmit the parsed and decoded contents. The home gateway 2120 may store the contents reproduction capability of the respective display devices 2130-1 to 2130-m and utilize the stored contents reproduction capability. In addition, the home gateway 2120 may also frequently update the stored contents reproduction capability.

According to one or more exemplary embodiments, to reproduce the contents, the parser and the codec corresponding to an encoding scheme of the corresponding contents may be used.

Figure 22:
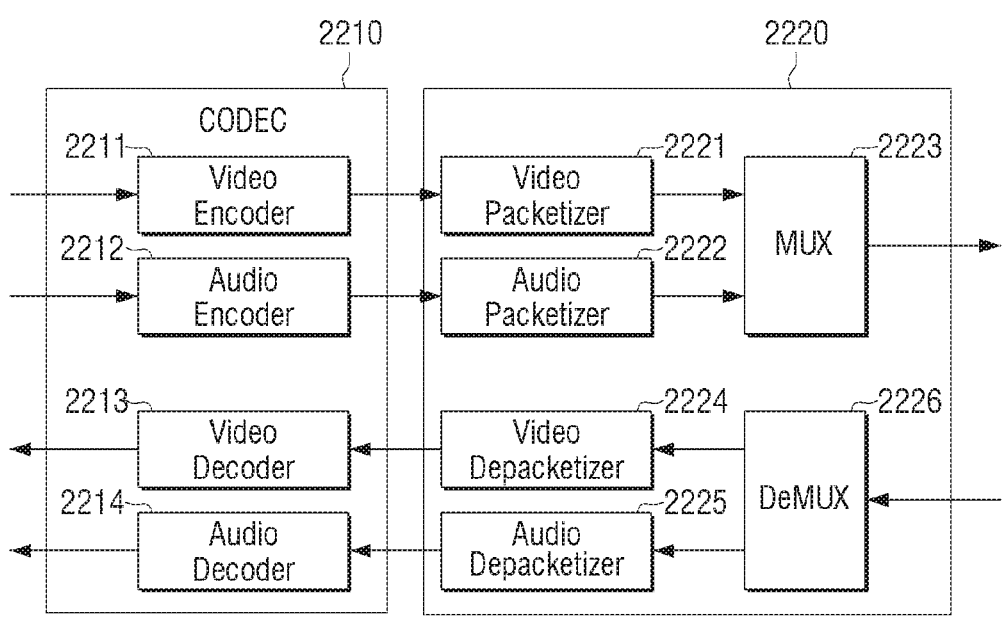
FIG. 22 is a view illustrating one example of a codec and parser configuration which may be applied to one or more exemplary embodiments.

FIG. 22 illustrates an example of configurations of the parser and the codec. The codec 2210 performs an encoding processing for reducing a data size and a decoding processing, which is a reverse process of the encoding processing. The parser 2220 performs a process of creating the encoded data into moving picture contents having a format such as AVI, MP4, or the like, and a reverse process thereof.

As described above, the codec may be implemented as various kinds such as a moving picture expert group (MPEG) codec, a Divx codec, an AC3 codec, an OGG codec, an Xvid codec, an H.264 codec, a wmv7, 8, 9 codec, a video codec, and the like.

Referring to FIG. 22, the codec 2210 includes a video encoder 2211, an audio encoder 2212, a video decoder 2213, and an audio decoder 2214. In addition, the parser 2220 includes a video packetizer 2221, an audio packetizer 2222, a mux 2223, a video depacketizer 2224, an audio depacketizer 2225, and demux 2226.

The video encoder 2211 in the codec 2210 is a configuration for encoding video data forming the contents, and the audio encoder 2212 is a configuration for encoding audio data. The encoding scheme may be implemented by various schemes such as a moving picture expert group (MPEG), H.264, and the like, according to a kind of codec.

The video data and the audio data encoded by the video encoder 2211 and the audio encoder 2212 are each provided to the video packetizer 2221 and the audio packetizer 2222 within the parser 2220. The video packetizer 2221 configures the video data to a video packet having a preset size, and the audio packetizer 2222 configures the audio data to an audio packet having a preset size. Each packet may be classified into a header and a payload region having a predetermined size. The video data and the audio data may be disposed in the payload region. The mux 2223 multiplexes the video packet and the audio packet to configure one A/V contents stream.

In the case in which the contents are reproduced, the demux 2226 in the parser 2220 demultiplexes the contents to detect the video packet and the audio packet. The detected video packet and audio packet are input to the video depacketizer 2224 and the audio depacketizer 2225, respectively. The video depacketizer 2224 removes the header of the video packet and detects the video data recorded in the payload region. The audio depacketizer 2225 removes the header of the audio packet and detects the audio data. The video data and the audio data are provided to the video decoder 2213 and the audio decoder 2214 in the codec 2210. The video decoder 2213 and the audio decoder 2214 perform the decoding for the video data and the audio data, respectively.

The configurations of the codec and the parser as described above may be applied to the server device or the client device in one or more exemplary embodiments. According to another exemplary embodiment, only some frames of the contents may be first processed according to the reproduction capability of the client device and be then transmitted.

Figure 23:
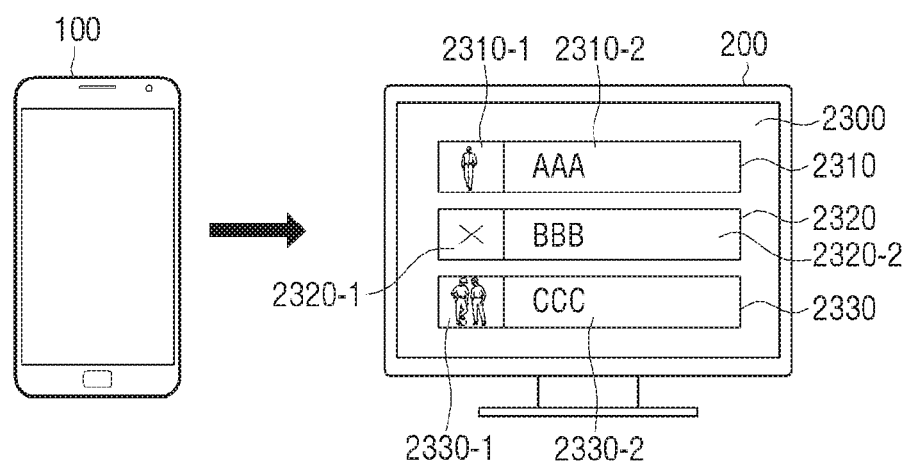
FIGS. 23 and 24 are views illustrating operations of a server device and a client device according to another exemplary embodiment.
Figure 24:
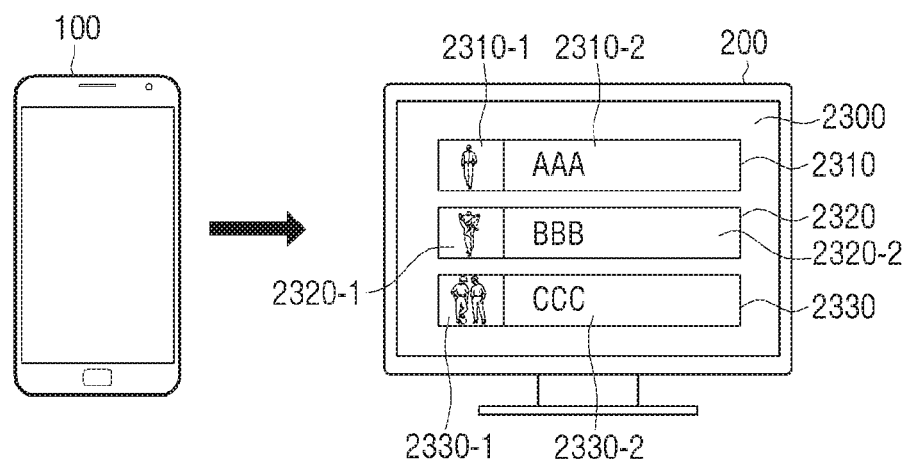

FIGS. 23 and 24 are views illustrating one or more exemplary embodiments.

Referring to FIG. 23, the server device 100 transmits information about the contents which may be provided to the client device 200. The client device 200 displays a screen 2300 using the transmitted information.

The displayed screen 2300 displays information 2310, 2320, and 2330 about the contents which may be provided by the server device 100. Each information may be configured of images 2310-1, 2320-1, and 2330-1, and texts 2310-2, 2320-2, and 2330-2.

The client device 200 may perform the parsing and the decoding for the data provided from the server device 100 to display the images 2310-1, 2320-1, and 2330-1 on the screen 2300. Here, the images 2310-1, 2320-1, and 2330-1 may be a thumbnail still image, and may also be a moving picture configured of a predetermined number of frames.

However, as described above, in the case in which the client device 200 does not have the parser or the codec, the images may not be normally displayed. In this case, as in an image 2320-1 included in a second information 2320 of FIG. 23, a sign or symbol such as X may be displayed, or a region of the image 2320-1 itself may be black-processed. Therefore, a problem that the user of the client device 200 may not see the image of the corresponding contents occurs.

In this case, the server device 100 may perform the processing such as the parsing and the decoding for the corresponding image 2320-1 to transmit the parsed and decoded image to the client device 200.

FIG. 24 illustrates a state in which the image 2320-1 is processed by the server device 100 and is displayed on the client device 200. In FIG. 24, the server device 100 may be implemented as the configuration as described in one or more exemplary embodiments above.

For example, according to an exemplary embodiment, in the case in which the server device 100 is implemented as the configuration as illustrated in FIG. 3, the storing unit 130 stores the contents to be provided to the client device, and the communication unit 110 receives the reproduction capability information from the client device 200. As described above, the reproduction capability information may be periodically received, and may also be received each time a certain event occurs such as the case in which the client device 200 is turned on or is reset, the case in which the server device 100 requests the reproduction capability information, or the like.

The controlling unit 120 may transmit guide information associated with the contents stored in the storing unit 130 to the client device 200. The guide information may include images and texts as illustrated in FIGS. 23 and 24. In this case, the controlling unit 120 determines whether it performs a partial processing for the contents to be provided to the client device 200 based on the reproduction capability information of the client device 200. Partial processing may refer to a situation in which at least one audio or visual processing function is necessary to reproduce the content. Partial processing may indicate that only some of the contents are processed, but not all of the contents are processed. The contents may be classified into a preset data unit. For example, in the case in which the contents are classified into a frame unit, if it is determined that the partial processing is required, the controlling unit 120 selects some frames from the contents. In addition the controlling unit processes the selected frame to be reproducible in the client device 200 and transmits the processed frame to the client device 200 through the communication unit 110.

The controlling unit 120 may determine whether the partial processing is required based on the attributes of the contents and the reproduction capability information. For example, if the client device 200 has the parser and the codec that may process the contents, the controlling unit may determine that the partial processing is unnecessary, and if the client device 200 does not have at least one of the parser and the codec, the controlling unit may determine that the partial processing should be used.

A unit of the contents to be partially processed may be classified according to various references as described above. The controlling unit 120 may select at least one of the various image frames such as a highlight image frame designated by a highlight portion, an image frame sampled according to a preset period, an image frame having a preset order, and the like, in the contents to perform at least one processing of the parsing and the decoding for the selected frame.

Here, the highlight image frame may be designated by the additional information such as meta data. The preset period is a period of a unit of the number of defined frames. For example, one frame per 600 frames is sampled, such that the processing such as the parsing and the decoding may be performed for the sampled frame. The image frame having the preset order may be image frames disposed at defined timings such as contents reproduction first half, a middle part, a latter half, and the like. The number of selected image frames, or a data length may be arbitrarily defined.

As described above, if some of the frames are processed in the reproducible form and are transmitted to the client device 200, the client device 200 may display the information 2310, 2320, and 2330 normally including an image of each contents as illustrated in FIG. 24.

If the user selects one item from the screen as illustrated in FIG. 24, the server device 100 transmits the contents corresponding to the selected item to the client device 200. In the example of FIG. 23, the contents corresponding to the first and third information 2310 and 2330 may be reproduced by the client device 200. Therefore, if one of the first and third information 2310 and 2330 is selected, the server device 100 transmits the corresponding contents to the client device 200 as is.

Because the contents corresponding to the second information 2320 may not be reproduced, the server device 100 performs at least one processing of the parsing and the decoding for the contents corresponding to the second information 2320 to transmit the parsed and decoded contents to the client device 200. Therefore, even though the client device 200 does not have both the parser and the codec, the client device 200 may view advance information about each contents to the user and may also provide the reproduction screen in the case in which the contents are selected.

Although FIG. 24 illustrates the operation of the server device 100 including the communication unit 110, the controlling unit 120, and the storing unit 130, the above-mentioned operation may also be implemented by the method for sharing the contents performed by the server device.

In addition, the methods according to one or more exemplary embodiments described above may be generated by software and may be mounted in the server device or the client device.

According to an exemplary embodiment, the server device may be implemented with a non-transitory computer readable medium having a program stored thereon, wherein the program performs receiving reproduction capability information from a client device, and processing contents in a reproducible form and transmitting the contents to the client device if it is determined that the client device may not reproduce the contents based on attributes of the contents to be provided to the client device and the reproduction capability information.

In addition, the client device may be implemented with a non-transitory computer readable medium having a program stored thereon, wherein the program performs generating reproduction capability information including parser and codec information of the client device, transmitting the generated reproduction capability information to a server device, and receiving contents from the server device and reproducing the contents.

The client device may be implemented with a non-transitory computer readable medium having a program stored thereon, wherein the program performs receiving and storing a parser and codec list from a server device, receiving a reproduction request for contents stored in the server device, determining whether the contents may be reproduced using information about a parser and a codec included in the client device and the received parser and codec list, and transmitting a content sharing request to the server device if the contents may be reproduced and displaying a reproduction disable message if the contents may not be reproduced.

The non-transitory computer readable medium may refer to a machine-readable medium semi-permanently storing the data. Various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

Although one or more exemplary embodiments have been shown and described, it should be understood that the present disclosure is not limited to the exemplary embodiments and may be changed without departing from the spirit and the scope. Accordingly, such modifications, additions and substitutions should be understood to fall within the scope of the present disclosure.

The invention claimed is:

1. A method for sharing contents of a server device, the method comprising:
receiving reproduction capability information from a client device, the reproduction capability information comprising information about whether the client device includes a parser and a codec for processing contents;
determining whether to perform partial processing for the contents to be provided to the client device, based on the reproduction capability information,
wherein the determining comprises determining whether the client device includes each of the parser and the codec for processing the contents based on the reproduction capability information,
in response to determining that the client device includes the codec and does not include the parser, parsing the contents and transmitting the parsed contents, and
in response to determining that the client device does not include the codec and includes the parser, parsing the contents, decoding the parsed contents and transmitting the parsed and decoded contents.

2. The method as claimed in claim 1, wherein the processing comprises:
in response to determining that the client device has the parser and the codec for processing the contents based on attributes of the contents and the reproduction capability information, the partial processing is not performed, and
in response to determining that the client device does not have at least one of the parser and the codec based on the attributes of the contents and the reproduction capability information, the partial processing is performed.

3. The method as claimed in claim 2, further comprising:
selecting at least one of a highlight image frame, an image frame sampled according to a preset period, and an image frame having a preset order in the contents; and
performing at least one processing among parsing and decoding for the selected at least one of the highlight image frame, the image frame sampled according to the preset period, and the image frame having the preset order in the contents.

4. The method as claimed in claim 2, further comprising performing at least one processing among parsing and decoding for all of the contents if at least one frame is selected by the client device, and transmitting the parsed contents and the decoded contents to the client device.

5. A server device comprising:
a memory configured to store contents to be provided to a client device;
a communicator configured to receive reproduction capability information from the client device, the reproduction capability information comprising information about whether the client device includes a parser and a codec for processing the contents; and
a controller configured to:
determine whether to perform a partial processing for the contents to be provided to the client device based on the reproduction capability information; and
determine whether the client device includes each of the parser and the codec for processing the contents based on the reproduction capability information,
in response to determining that the client device has the codec and does not have the parser, parse the contents and transmit the parsed contents, and
in response to determining that the client device does not have the codec and has the parser, parse the contents, decode the parsed contents and transmit the parsed and decoded contents.

6. The server device as claimed in claim 5, wherein the controller is further configured to not perform the partial processing if the client device has the parser and the codec for processing the contents based on attributes of the contents and the reproduction capability information, and perform the partial processing if the client device does not have at least one of the parser and the codec based on the attributes of the contents and the reproduction capability information.

7. The server device as claimed in claim 6, wherein the controller is further configured to select at least one of a highlight image frame, an image frame sampled according to a preset period, and an image frame having a preset order in the contents to perform at least one processing among parsing and decoding for the selected at least one of the highlight image frame, the image frame sampled according to the preset period, and the image frame having the preset order in the contents.

8. The server device as claimed in claim 6, wherein the controller is further configured to perform at least one processing among parsing and decoding for all of the contents if at least frame is selected by the client device to transmit the parsed contents and the decoded contents to the client device.

9. A method for sharing contents of a client device, the method comprising:
receiving and storing a parser list and a codec list from a server device;
receiving a reproduction request for contents stored in the server device;
transmitting reproduction capability information to the server device, the reproduction capability information comprising information about whether the client device includes a parser and a codec for processing the contents;
determining whether the contents are reproducible by using information about the parser and the codec included in the client device and the received parser list and the received codec list;
in response to determining that the client device has the codec and the parser, transmitting a content sharing request to the server device;
in response to determining that the client device has the codec and does not have the parser, transmitting a request to the server device to parse the contents, and transmit the parsed contents; and
in response to determining that the client device does not have the codec and has the parser, transmitting a request to the server device to parse the contents, decode the parsed contents and transmit the parsed and decoded contents.

10. A client device comprising:
a communicator configured to receive a parser list and a codec list from a server device;
a memory configured to store the parser list and the codec list;
an input interface configured to receive a reproduction request for contents stored in the server device;
a controller configured to:
control the communicator to transmit reproduction capability information to the server device, the reproduction capability information comprising information about whether the client device includes a parser and a codec for processing the contents;
determine whether the contents are reproducible by using information about the parser and the codec included in the client device and the received parser list and the received codec list;
in response to determining that the client device has the codec and the parser, transmit a content sharing request to the server device if the contents are reproducible;
in response to determining that the client device has the codec and does not have the parser, transmit a request to the server device to parse the contents, and transmit the parsed contents; and
in response to determining that the client device does not have the codec and has the parser, transmit a request to the server device to parse the contents, decode the parsed contents and transmit the parsed and decoded contents; and
a display configured to, in response to the server device determining that the parser cannot be installed, display a reproduction disable message.

11. A screen sharing system comprising:
a server device; and
at least one client device connected to the server device configured to display a main screen provided from the server device,
wherein the server device is configured to:
receive reproduction capability information from the client device in response to a reproduction capability of the client device changing, the reproduction capability information comprising information about whether the client device includes a parser and a codec for processing contents, and
in response to determining that the client device is not capable of reproducing the contents based on attributes of the contents, process the contents in a reproducible form to transmit the processed contents to the client device,
wherein the client device displays a reproduction screen for displaying the contents transmitted from the server device on the main screen, and
wherein the processing the contents in the reproducible form comprises at least one of parsing and decoding for the contents.

12. The screen sharing system as claimed in claim 11, wherein the server device is configured to transmit the contents to the client device in response to determining that the client device is capable of reproducing the contents, and
the client device is configured to parse and decode the contents transmitted from the server device and display the reproduction screen on the main screen.

13. A method for sharing contents of a server device, the method comprising:
selecting contents to transmit to a client device;
receiving reproduction capability information from the client device in response to a reproduction capability of the client device changing, the reproduction capability information comprising information about whether the client device includes a parser and a codec for processing contents;
determining whether the client device has the parser and the codec for processing the contents;
performing processing on the contents according to the determination; and
transmitting the contents to the client device,
wherein the processing the contents comprises at least one of parsing and decoding for the contents.

14. The method of claim 13, wherein the performing processing on the contents comprises:
- parsing the contents and decoding the contents in response to determining that the client device does not have the parser or the codec;
- parsing the contents and not decoding the contents in response to determining that the client device has the codec and does not have the parser; and
- transmitting the contents to the client device without parsing the contents or decoding the contents in response to determining that the client device has the parser and the codec.

\* \* \* \* \*